United States Patent
Nagakubo et al.

[11] Patent Number: 5,900,621
[45] Date of Patent: May 4, 1999

[54] LIGHT TRANSMITTER HAVING AN AUTOMATIC BIAS CONTROL CIRCUIT

[75] Inventors: Yasunori Nagakubo, Kawasaki; Sadao Ibukuro, Tama; Akihiko Hayashi, Yokohama; Takashi Tsuda, Tokyo, all of Japan

[73] Assignee: Fujitsu Limited, Kanagawa, Japan

[21] Appl. No.: 08/903,104

[22] Filed: Jul. 30, 1997

[30] Foreign Application Priority Data

Oct. 24, 1996 [JP] Japan ..................... 8-282498

[51] Int. Cl.⁶ ..................... H01J 40/14
[52] U.S. Cl. ............... 250/205; 250/214 AG; 359/180
[58] Field of Search ........... 250/205, 214 AG, 250/214 RC, 214 R; 359/180, 181, 187; 330/59

[56] References Cited

U.S. PATENT DOCUMENTS 5,317,443  5/1994  Nishimoto ................. 359/187

*Primary Examiner*—Que T. Le
*Attorney, Agent, or Firm*—Helfgott & Karas, P.C.

[57] ABSTRACT

In a light transmitter comprises an automatic bias control circuit which automatically controls a bias for an external modulator, a part of a light output/input signal of the external modulator is branched to detect an electrical monitor signal and a gain control signal is generated in inverse proportion to the level of the monitor signal to control the gain of the automatic bias control circuit.

30 Claims, 21 Drawing Sheets

2 MONITOR SIGNAL

1 MONITOR LIGHT

2 MONITOR SIGNAL

5 AMP. OUTPUT
(MONITOR SIGNAL x AMP. GAIN)
*CONSTANT AMP. GAIN

OPERATING POINT DRIFT 6

5 AMP. OUTPUT
(MONITOR SIGNAL x AMP. GAIN)

LIGHT TRANSMITTER HAVING AN AUTOMATIC BIAS CONTROL CIRCUIT

BACKGROUND OF THE INVENTION

1. Field of the Invention

The present invention relates to a light (or optical) transmitter, and in particular to a light transmitter comprising an automatic bias control circuit which automatically controls biases for external modulators which respectively modulate light inputs of various wavelengths such as a wavelength division multiplex (WDM) system.

For light modulations in a light transmitter, there are a direct modulation, an internal modulation, and an external modulation, which are currently used in relation to the kind of a laser as a light source and a communication rate etc.

In the direct modulation, the higher the transmission rate becomes the more the light signal is influenced with chirping, and therefore a long distance transmission becomes difficult due to wavelength distributions within an optical fiber.

Then, external modulators such as a Mach-Zehnder type external modulator made of $LiNO_3$ where the chirping is not fundamentally caused or an electric field absorbing modulator have been got much attention.

For the stabilization of a light communication system with such an external modulator for a long term, it is required to stabilize optical signals against thermal variation and aging.

Moreover, as the capacity of communications are large-scaled in recent years, a technology in which the capacity is enhanced which can be transmitted via a single optical fiber by differentiating the wavelengths of modulated optical signals and multiplexing them as in the WDM system for optical communications at a high speed is applied to the light transmitter.

Therefore, it is now demanded that the technology which stabilizes the transmission of an optical signal can be applied to the WDM technology without problems.

2. Description of the Related Art

FIG. 19 shows the prior art light transmitter in the Japanese Patent Laid-open Publication No. 3-251815 or its U.S. counterpart U.S. Pat. No. 5,170,274 entitled "Optical Transmission". The disclosure of this U.S. Pat. No. 5,170,274 is incorporated herein by reference. A light source 1 provides its light output signal for an external modulator 2. The external modulator 2 has a modulation input terminal 2a and a bias input terminal 2b. To the modulation input terminal 2a is supplied a low frequency superimposed signal (driving signal) in which an input signal (logic signal) is superimposed at a driver 3 with a reference low frequency signal from an oscillator 4.

To the bias input terminal 2b is supplied a bias voltage provided by an automatic bias control circuit 11 (ABC loop) composed of an output terminal of the external modulator 2, a branch device 5, a photoelectric transducer 6, a filter (BPF) 7, an amplifier 8, a synchronous detector 9, and a bias controller 10.

In this automatic bias control circuit 11, the branch device 5 takes a part of the light output signal out of the external modulator 2 as a monitor light ① and transduces it into a monitor signal ② which is an electric signal and supplied to the filter 7. The filter 7 takes only a low frequency component, out of the monitor signal ②, which corresponds to the reference low frequency signal from the oscillator 4 and is sent to the amplifier 8 which generates an amp. output signal ⑤ amplified with a constant amp. gain.

The synchronous detector 9 compares the reference low frequency signal from the oscillator 4 with the phase of the amp. output signal ⑤ and sends a signal corresponding to the phase difference to the bias controller 10. The bias controller 10 provides an operating drift correction signal ⑥ for the bias input terminal 2b of the external modulator 2.

That is, an operating point drift is caused in the input/output characteristic of the external modulator 2 due to temperature changes and/or aging, etc, resulting in the quenching ratio of the light output signal being deteriorated The automatic bias control circuit 11 detects the frequency component of the low frequency signal output superimposed with the light output signal of the external modulator 2, compares it in phase with the reference low frequency signals from oscillator 4, and detects the drifting direction of the operating point. The operating point of the external modulator 2 is controlled according to the drifting direction, thereby compensating the operating point drift (automatic bias control).

The above-mentioned prior art light transmitter has a fixed combination of a light source and an external modulator. Once a set point of the luminescence level of the light source is adjusted so that the automatic bias control circuit may be operable, there is no need to re-adjust the set point.

That is, the prior art automatic bias control circuit is designed according to a light level at which the laser emits light.

Also, the automatic bias control circuit employs a photo device and an amplifier. Unless these circuit elements are operated linearly, the operating point of the external modulator is not correctly set. The reason is that a nonlinear phase variation and in turn a corresponding set point error are caused when the circuit operates nonlinearly because the automatic bias control circuit controls the phase relation of a modulating signal of e.g. 1 kHz detected with the synchronous detector.

Therefore, in the prior art light transmitter, the gains of the photo device and the amplifier in the automatic bias control circuit are constant so that the allowance of the automatic bias control circuit with respect to the optical level variation of the light source is narrow.

On the other hand, the following problems have now been found upon practical uses of such a circuit as the light transmitter in the WDM system where a lot of light sources with different wavelengths are combined with the external modulators.

FIG. 20 shows an example of the prior art light transmitter applied to the WDM system In this figure, reference numerals 1-1~3-3 denote laser light sources (LDs), 2-1~3-3 external modulators, 3-1~3-2 driving circuits (drivers), and 11-1~11-3 automatic bias control circuits (ABC loops), respectively. The LDs 1-1~1-3 emit light with different wavelengths λ1~λ3.

Thus, in case that the luminescent wavelengths of the LDs 1-1~1-3 are differentiated, it is necessary to change bias currents applied to the LDs1-1~1-3. Therefore, the optical output levels of each of the LDs1-1~1-3 are to be different.

In this case, the amplitudes of monitor signals obtained respectively from the outputs of the external modulators 2-1~2-3 are different from each other according to the difference of those optical levels.

As a result, low frequency (e.g. 1 KHz) signal components in the monitor signals are influenced by level variations of the light sources because the low frequency signal components are modulated with a modulation factor, e.g. 5% with respect to that of the input signal.

That is, while the modulating signal (driving signal) from the driver is converted into an optical modulating signal by the external modulator, the amplitude of the optical modulating signal changes naturally according to the optical level of the light source. For example, when a light with the level of −3 dBm is inputted from the light source, H level of the optical modulating signal is 0 dbi, the average level −3 dBm, and L level 0 dBm (non-luminescence), respectively, in an ideal case where the loss of the external modulator is zero and the quenching ratio is infinity.

Therefore, when the low frequency signal for a gain control is superimposed with the input signal to produce a modulating signal (driving signal), the modulation factor, i.e. the amplitude of the low frequency signal component in the monitor signal will also change according to the optical level of the light source.

This will be described with reference to FIG. 21 illustrating the prior art operation.

The monitor signal ② is provided as an output from the photoelectric transducer 6 in proportion to the level of the monitor light ① from the branch device 5, as seen from FIG. 21A As the amplitude of the low frequency signal component of the monitor signal ② varies, that of the output signal ⑤ of the amplifier 8 also varies, as seen from FIG. 21B.

Further, as the amplitude of the amp. output signal ⑤ varies, the operating point drift signal (compensation signal) ⑥ from the bias controller 10 also varies, as seen from FIG. 21C.

Thus, the detection of the monitor signal becomes difficult when the amplitude of the monitor signal varies smaller, where a normal automatic bias control is made impossible.

Therefore, when the prior art automatic bias control circuit is applied to the light WDM system, it is necessary to design the automatic bias control circuit individually corresponding to the level difference of the light sources, so that even if the amplitudes taken out of the low frequency superimposed signal are different from each other, the ABC circuit corresponding to the individual levels is realized.

Even if the ABC circuits are designed individually corresponding to the light sources, the output levels of the&lasers changes due to deteriorations etc. of the laser used for respective light sources. As a result, if the amplitude of the monitor signal becomes small, the level variation will be difficult to be dealt with.

SUMMARY OF THE INVENTION

It is accordingly an object of the present invention to provide a light transmitter comprising an external modulator for modulating an output signal of a light source with an electrical monitor signal and an automatic bias control circuit, including an amplifier, which automatically controls a bias for the external modulator without providing automatic bias control circuits individually corresponding to light sources, capable of making an automatic bias control even when the level of the light source decreases due to faults.

[1] For the achievement of the above object, in a light transmitter according to the present invention; the above-noted automatic bias control circuit (ABC loop) has a monitor signal detector which branches a part of a light output signal of the external modulator to detect the monitor signal, and a gain control circuit which generates a gain control signal which decreases in level as the monitor signal increases and vice versa to control a gain of the amplifier in the automatic bias control circuit.

Specifically, the arrangement according to the present invention schematically shown in FIG. 1 is different from the prior art one in that the former also supplies the monitor signal ② to the gain control circuit 12 which then generates the gain control signal ③ and supplies it to the amplifier 8 whereby the amplifier 8 is gain-controlled according to the level of the monitor light.

The operation of the arrangement shown in FIG. 1 will be described with reference to FIG. 2. As the optical level of the monitor light ① provided from the external modulator 2 to the photoelectric transducer 6 through the branch device 5 varies as shown in FIG. 1A, the level of the monitor signal ② which is an electric output signal increases in response to the level of monitor light ①.

Then, the gain control circuit 12 outputs the gain control signal ③ in the reverse form of the characteristic of the monitor signal in accordance with the increase/decrease of the monitor signal ②, as seen from FIG. 1B.

Namely, while the monitor light ① increases or decreases in proportion to the optical output from the light source 1, the gain control circuit 12 which receives the monitor signal ② increased corresponding to the monitor light ① controls by means of the gain control signal ③ such that the gain ④ of the amplifier 8 is decreased to lower the amp. output signal ⑤. It is to be noted that the characteristics of FIGS. 1B and 1C are shown in the form of linearity for the convenience's sake while they actually have a nonlinear form depending on the characteristic of devices used As a result, since the relationship between the gain control signal ③ and the amp. gain ④ is opposite as shown in FIG. 1C, the amp. output signal ⑤ can be approximated to a constant value as shown in FIG. 1D regardless of the level of the monitor signal ②.

Therefore, the amp. output signal ⑤ is going to be controlled to a constant value, and so the operating point drift signal ⑥ from the bias controller 10 is free from such an operating point drift.

[2] The above-noted monitor signal detector may comprise a branch device which branches a part of the light output signal as a monitor light, and a photoelectric transducer which converts the monitor light into the monitor signal.

[3] In addition, the above-noted light transmitter may further comprise a monitor signal detector which branches a part of the light input signal of the external modulator to detect the monitor signal; and a gain control circuit which generates a gain control signal which decreases in level as the monitor signal increases and vice versa to control a gain of the amplifier in the automatic bias control circuit.

Namely, while the present invention [1] as above-mentioned controls the amp. gain by means of the gain control signal generated by the gain control circuit via the monitor signal in the automatic bias control circuit, this invention takes the light output signal out of the light source to the external modulator at the monitor signal detector. The gain control circuit generates a gain control signal which decreases in level as the monitor signal increases and vice versa, i.e. increases in level as the monitor signal decreases, thereby controlling the gain of the amplifier in the automatic bias control circuit.

[4] In the light transmitter according to the present invention [3], the monitor signal detector may comprise a branch device which branches a part of the light input signal as a monitor light, and a photoelectric transducer which converts the monitor light into the monitor signal.

[5] In the light transmitter according to the present inventions [1] to [4], the gain control circuit may comprise a series circuit of an average detector and an inverting amplifier.

[6] In the light transmitter according to the present inventions [1] to [4], the gain control circuit may comprise a series circuit of a peak detector and an inverting amplifier.

Specifically, in the gain control circuit in the present invention [5] or [6], the monitor signal from the photoelectric transducer forming the monitor signal detector is detected by the average detector or the peak detector in the form of average or peak value, which is furnished for the inverting amplifier. The inverting amplifier outputs the gain control signal in the reversed form of the input signal. The gain control signal may decrease in level as the monitor signal increases and vice versa

[7] In the light transmitter according to the present invention [2], the photoelectric transducer may comprise a photo device, connected to a load resistor, which supplies the output voltage of the load resistor for the gain control circuit.

Namely, the monitor light from the branch device is transduced into the electric monitor signal by the photo device which is the photoelectric transducer, and is supplied to the gain control circuit in the form of a voltage drop based on the current flowing through the load resistor connected to the photo device.

[8] In the light transmitter according to the present invention [7], the photo device may comprise a PIN photo diode.

[9] In the light transmitter according to the present invention [7], the photo device may comprise an APD.

[10] Alternatively, in the light transmitter according to the present invention, the automatic bias control circuit may comprise a branch device which branches a part of the light output signal of the external modulator as a monitor light and a photo device which transduces the monitor light into the monitor signal and is connected to a variable load resistor. In this context, the light transmitter further comprises a gain control circuit which inputs a load voltage of the variable load resistor as the monitor signal and generates a gain control signal for controlling the variable load resistor so as to generate a load voltage which decreases in level as the monitor signal increases and vice versa.

Namely, in this invention, a variable-type resistor is used as the load resistor of the photo device forming the photoelectric transducer. The gain control circuit does not control the gain of the amplifier in the automatic bias control circuit, but generates a gain control signal in inverse proportion to the level of the monitor signal and supplies it to the variable load resistor. The resistance of this variable load resistor is controlled by the gain control signal, resulting in the monitor signal approaching to a constant value, as shown in FIG. 2D.

[11] In another aspect of the light transmitter according to the present invention, the automatic bias control circuit may comprise a branch device which branches a part of the light output signal of the external modulator as a monitor light and a photo device which transduces the monitor light into the monitor signal and is connected to a load resistor associated with a variable voltage power source. In this context, the light transmitter further comprises a gain control circuit which inputs a load voltage of the load resistor as the monitor signal and generates a gain control signal for controlling the variable voltage power source so as to generate a load voltage which decreases in level as the monitor signal increases and vice versa.

Namely, in this invention, the load resistor is not changed but the output voltage of the variable voltage power source connected to the load resistor is changed, resulting in an operation similar to the above invention [10].

[12] In further aspect of the light transmitter according to the present invention, the automatic bias control circuit may comprise a branch device which branches a part of the light output signal of the external modulator as a monitor light and an APD which transduces the monitor light into the monitor signal and is connected to a load resistor. In this context, the light transmitter further comprises an APD bias device for controlling a bias voltage of the APD and a gain control circuit which inputs a load voltage of the load resistor as the monitor signal and generates a gain control signal for controlling the APD bias device so as to generate a load voltage which decreases in level as the monitor signal increases and vice versa.

Namely, in view of the APD as the photo device being controlled in respect of the magnification, the gain control signal in inverse proportion to the level of the monitor signal from the APD is supplied to the APD bias device instead of the amplifier. Therefore, the APD bias device will control the magnification rate of the APD in the opposite direction to the level of the monitor signal.

[13] In further aspect of the light transmitter according to the present invention, the automatic bias control circuit may comprise a monitor signal detector which branches a part of the light output signal of the external modulator to detect the electrical monitor signal. In this context, the light transmitter further comprises an LD current controller connected to a laser diode employed as an input light source for the external modulator, and a gain control circuit which generates a gain control signal for a current control of the laser diode through the LD current controller so that the light output signal of the external modulator decreases in level as the monitor signal increases and vice versa.

Namely, in this invention, the gain control signal is supplied to the LD current controller connected to the laser diode (LD) as a light source instead of the amplifier in the automatic bias control circuit. As a result, since the LD current controller controls the current of the laser diode in the opposite direction to the level of the monitor signal, the optical input signal from the laser diode to the external modulator can be approximated to a constant value.

[14] In further aspect of the light transmitter according to the present invention, the automatic bias control circuit may comprise a monitor signal detector which branches a part of the light output signal of the external modulator to detect an electrical monitor signal. In this context, the light transmitter further comprises a light attenuator inserted between the external modulator and the light source, and a gain control circuit which generates a gain control signal for controlling the light attenuator so that a light input signal of the external modulator decreases in level as the monitor signal increases and vice versa.

Namely, in this invention, to approximate the light input signal to the external modulator to a constant value, the gain control circuit supplies the gain control signal, in the opposite direction to the monitor signal, to the light attenuator provided between the light source and the external modulator.

[15] In the light transmitter according to the present invention [14], a light amplifier may be substituted for the light attenuator.

[16] In further aspect of the light transmitter according to the present invention, the automatic bias control circuit may comprise a branch device which branches a part of the light output signal of the external modulator as a monitor light and a photoelectric transducer which transduces the monitor light into the monitor signal. In this context, the light transmitter further comprises a light attenuator inserted between the branch device and the photoelectric transducer, and a gain control circuit which generates a gain control signal for controlling the light attenuator so that the monitor light decreases in level as the monitor signal increases and vice versa.

Namely, in this invention, the light attenuator is inserted between the branch device and the photoelectric transducer both forming the automatic bias control circuit whereby the gain control circuit controls the light attenuator on the basis of the monitor signal as mentioned above.

[17] In the light transmitter according to the present invention [16], a light amplifier may be substituted for the light attenuator and so controlled by the light amplifier with the gain control signal from the gain control circuit so as to serve as the light attenuator.

[18] In the light transmitter according to the present invention [16], an electric field absorbing external modulator may be substituted for the light attenuator and so voltage-controlled with the gain control signal from the gain control circuit so as to serve as the light attenuator.

[19] In the light transmitter according to the present invention [14], an electric field absorbing external modulator may be substituted for the light attenuator.

[20] In the light transmitter according to the present inventions [1] to [19], the automatic bias control circuit may be provided respectively for plural modulators corresponding to plural light sources.

BRIEF DESCRIPTION OF THE DRAWINGS

Throughout the figures, the same reference numerals indicate identical or corresponding portions.

DESCRIPTION OF THE PREFERRED EMBODIMENTS

Figure 1:
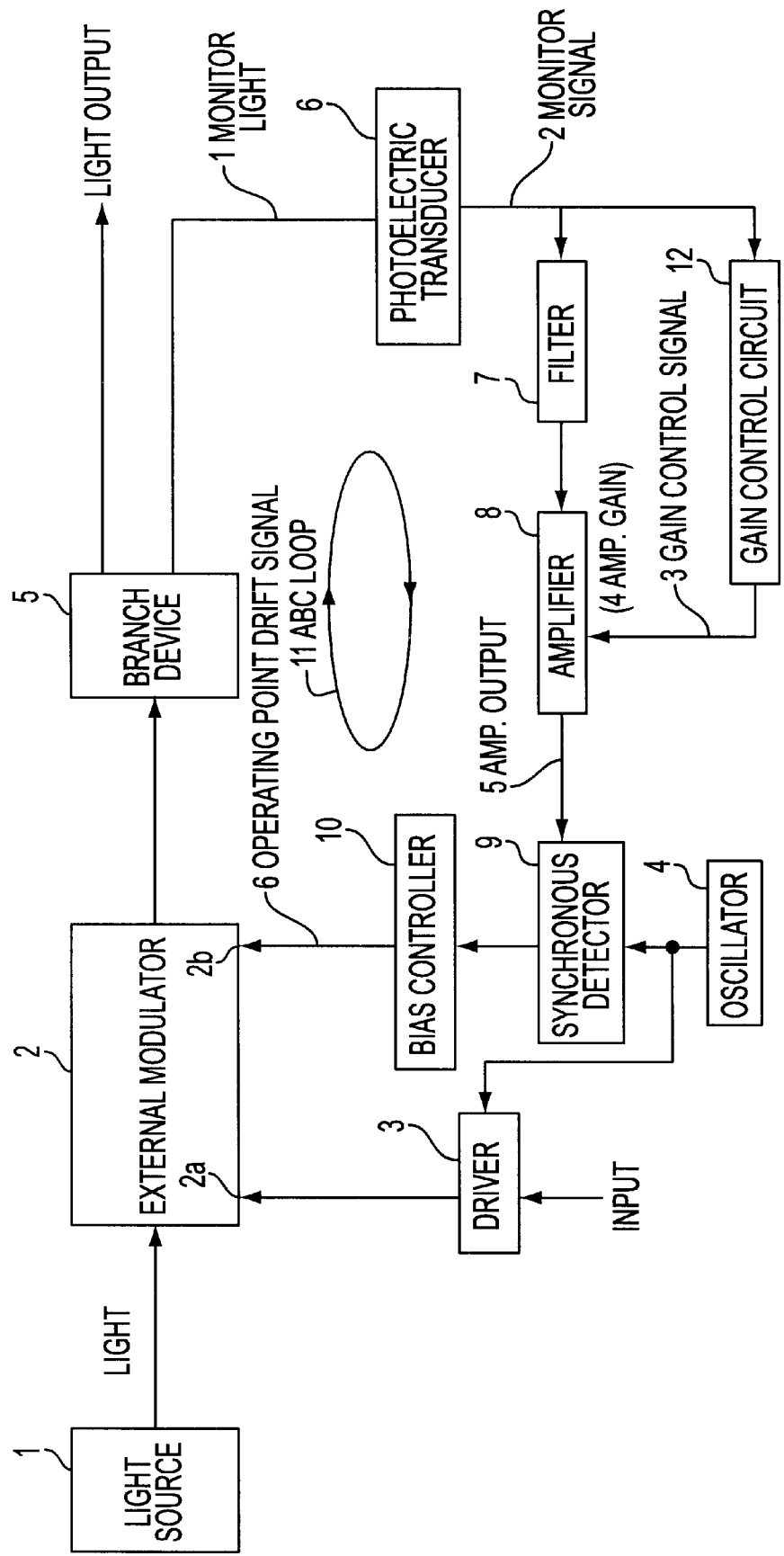
FIG. 1 is a block diagram for explaining the principle of a light transmitter according to the present invention.
Figure 3:
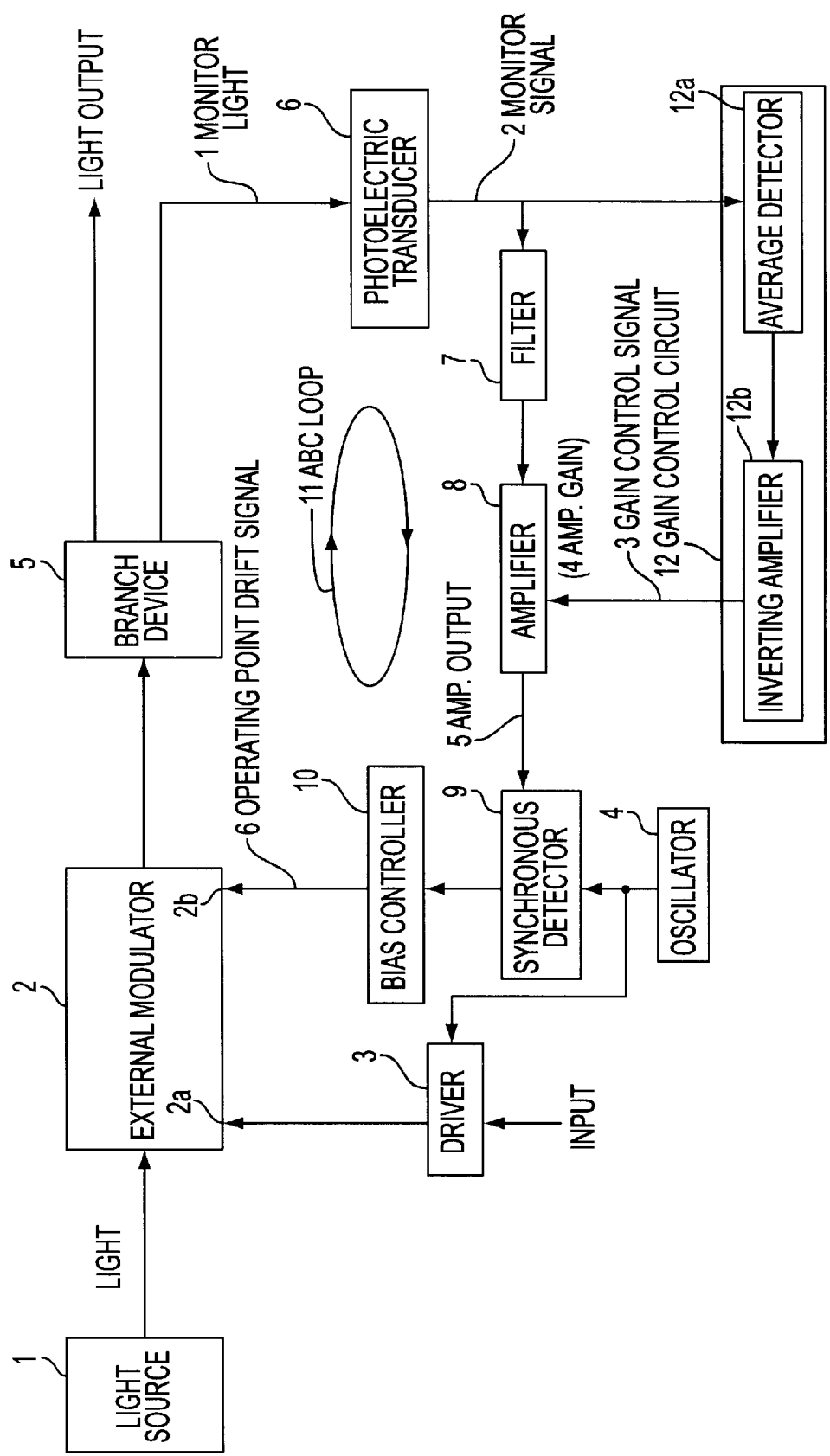
FIG. 3 is a block diagram showing an embodiment (1) of a light transmitter according to the present invention.

FIG. 3 shows an embodiment (1) of the arrangement of a light transmitter according to the present invention, shown in FIG. 1.

In this embodiment, except for the gain control circuit 12, the circuit configuration of the remaining portion may be substantially the same as that disclosed in U.S. Pat. No. 5,170,274 referred to before. The gain control circuit 12 is composed of a series circuit of an average detector 12a and an inverting amplifier 12b. The average detector 12a detects the average value in the monitor signal ② which is outputted from the photoelectric transducer 6 having a characteristic shown in FIG. 2A and supplies it to the inverting amplifier 12b. The inverting amplifier 12b has a characteristic shown in FIG. 2B and supplies to the amplifier 8 the gain control signal 3 which is an output signal in inverse proportion to the average value furnished from the average detector 12a It is to be noted that while FIGS. 2B and 2C show each characteristic in a linear form for convenience's sake, they actually have nonlinear region so that the term "inverse proportion" used hereinafter means an inverse characteristic to the one shown in FIG. 2B.

In other words, the inverting amplifier 12b provides as an output the gain control signal ③ in inverse proportion to the average value obtained from the average detector 12b and supplies it to the amplifier 8 where the fluctuation of the monitor signal ② is canceled as the gain of the amplifier 8 decreases when the monitor signal ② is large and vice versa. The amplifier 8 is to be controlled to approach a constant value as shown in FIG. 2D. As a result, the fluctuation of the light input signal from the light source 1 to the external modulator 2 is absorbed.

Figure 4:
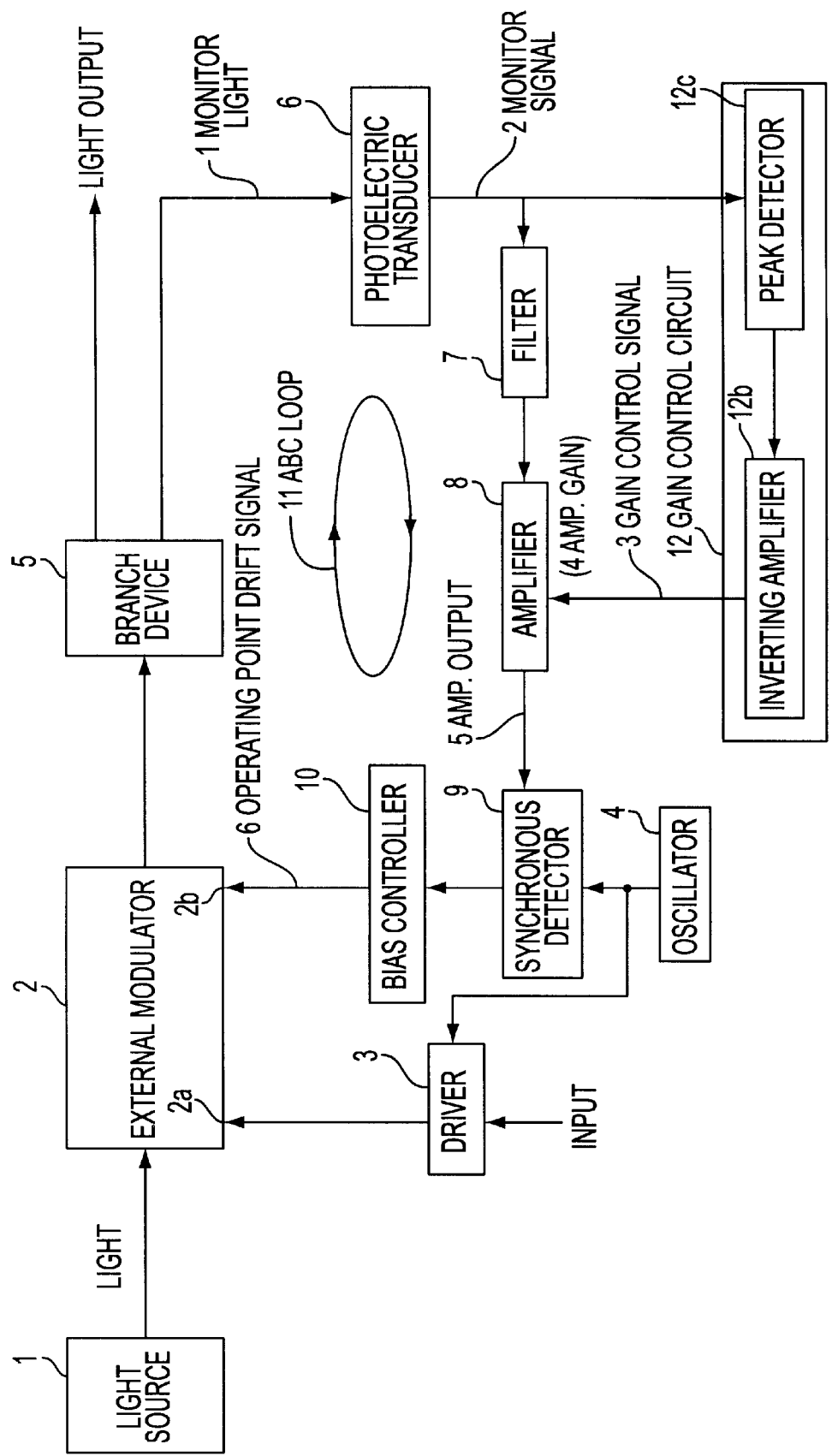
FIG. 4 is a block diagram showing an embodiment (2) of a light transmitter according to the present invention.

FIG. 4 shows an embodiment (2) of the light transmitter according to the present invention. The difference between the embodiment (1) shown in FIG. 3 and the embodiment (2) is that in the gain control circuit 12 the average detector 12a is replaced by the peak detector 12c.

Also in this case, the inverting amplifier 12b provides as an output the gain control signal ③ in inverse proportion to the peak value obtained from the peak detector 12c and supplies it to the amplifier 8 where the fluctuation of the monitor signal ② is canceled thereby absorbing the fluctuation of the light input signal from the light source 1 to the external modulator 2.

Figure 5:
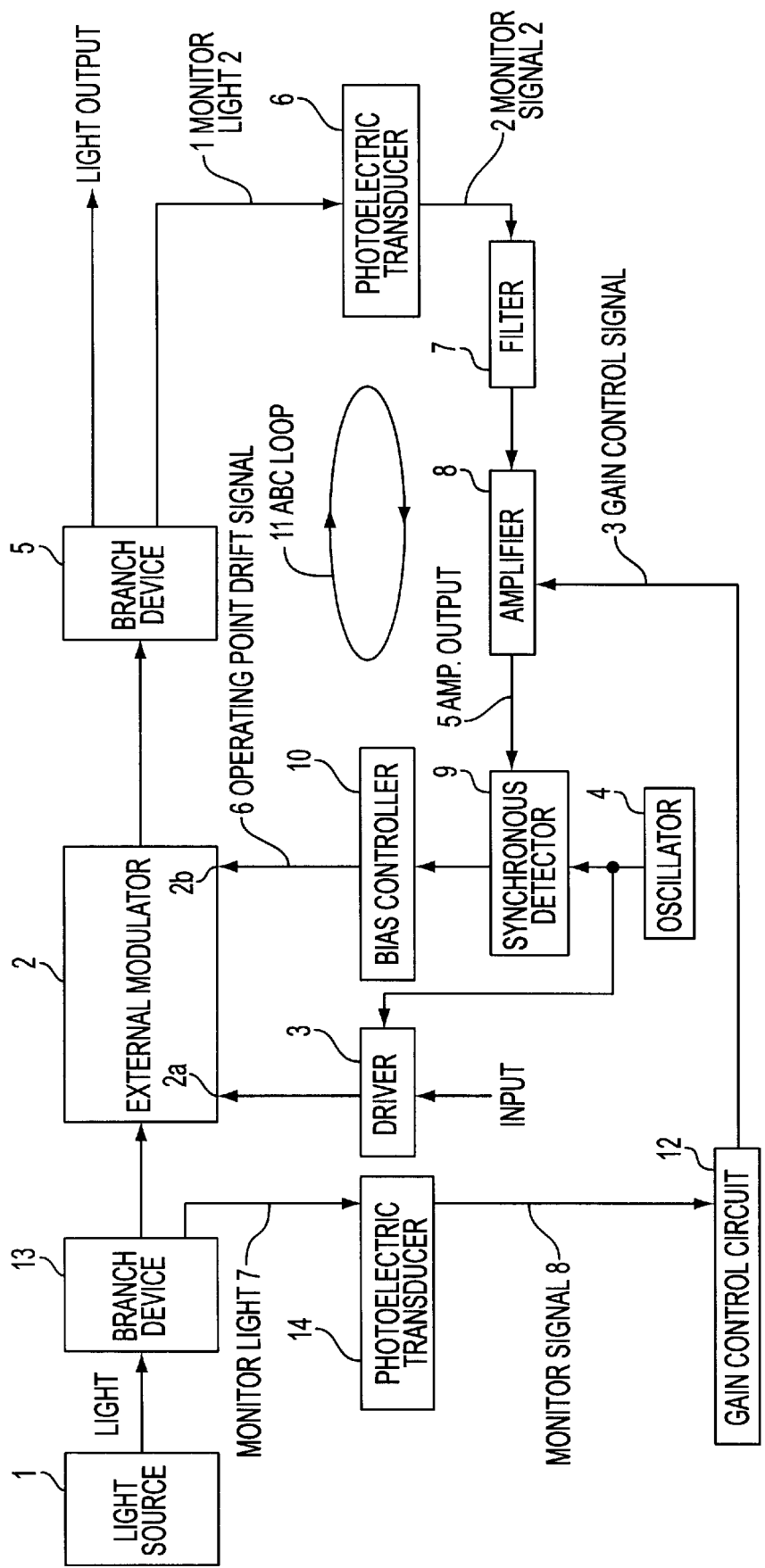
FIG. 5 is a block diagram showing an embodiment (3) of a light transmitter according to the present invention.

FIG. 5 shows an embodiment (3) of the light transmitter according to the present invention. In this embodiment, a branch device 13 different from the branch device 5 is provided between the light source 1 and the external modulator 2 to branch a part of the light output from the light source 1 as a monitor light ⑦. This monitor light ⑦ is transduced into a monitor signal ⑧ by a photoelectric transducer 14 different from the photoelectric transducer 6 to control the gain of amplifier 8 through the gain control circuit 12.

Figure 6:
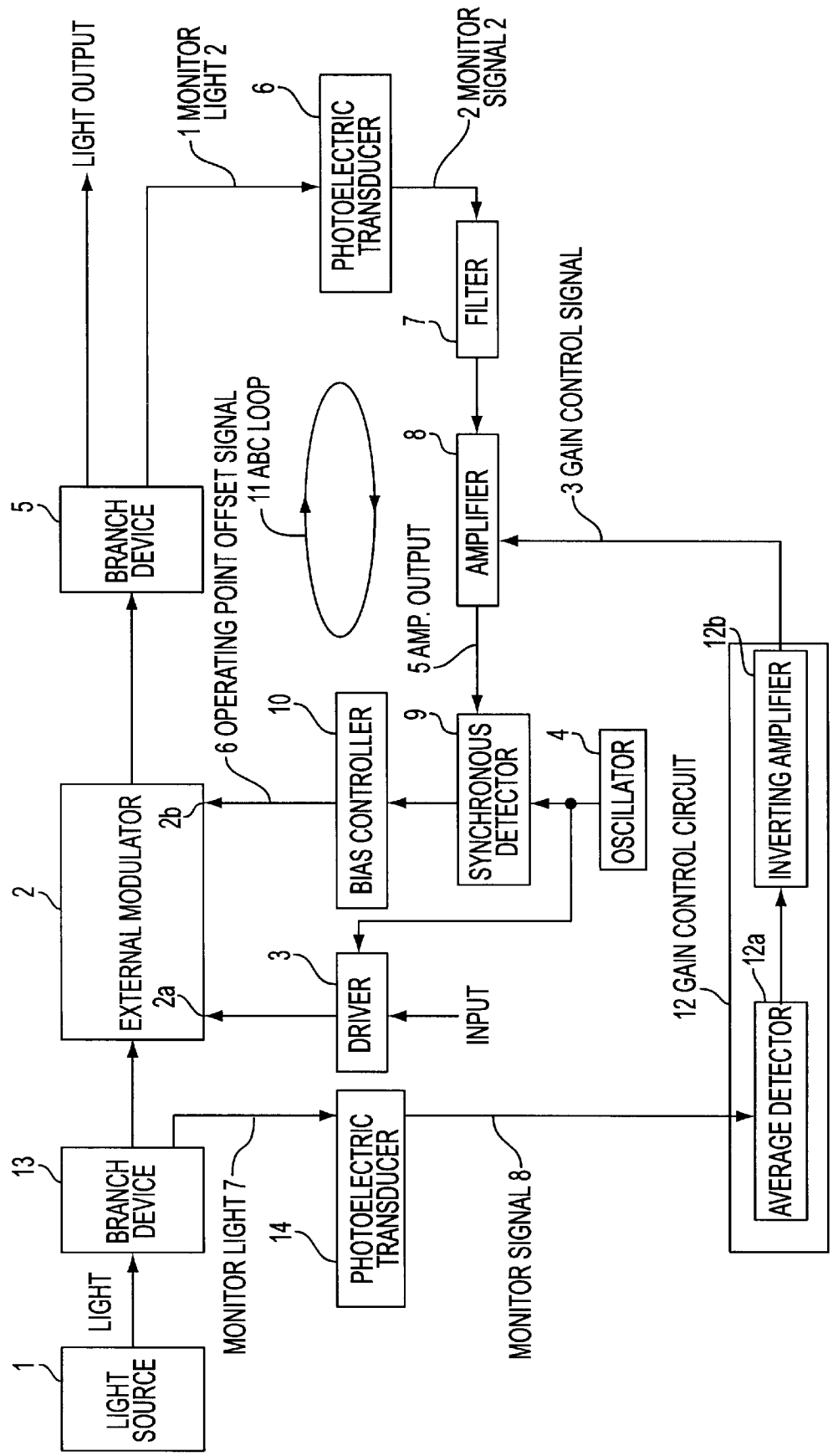
FIG. 6 is a block diagram showing an embodiment (4) of a light transmitter according to the present invention.

That is, while the gain of the amplifier 8 is controlled by means of the monitor signal ② in the automatic bias control circuit 11 in the embodiments shown in FIGS. 1, 3, and 6, the branch device 13 and the photoelectric transducer 14 are provided in this embodiment (3) besides the automatic bias control circuit 11. The monitor signal ⑧ from the photoelectric transducer 14 is converted by the gain control circuit 12 into the gain control signal ③ in inverse proportion to the level of the monitor signal ⑧ corresponding to the light input signal of the external modulator 2 and supplies it to the amplifier 8. As a result, the fluctuation of the light output signal from the light source 1 to the external modulator 2 is compensated as shown in FIG. 2D.

FIG. 6 shows an embodiment (4) of the gain control circuit 12 in the embodiment (3) shown in FIG. 5. In this embodiment, the gain control circuit 12 is formed of a series circuit of the average detector 12a and the inverting amplifier 12b and has the same operation as the embodiment in FIG. 3.

Figure 7:
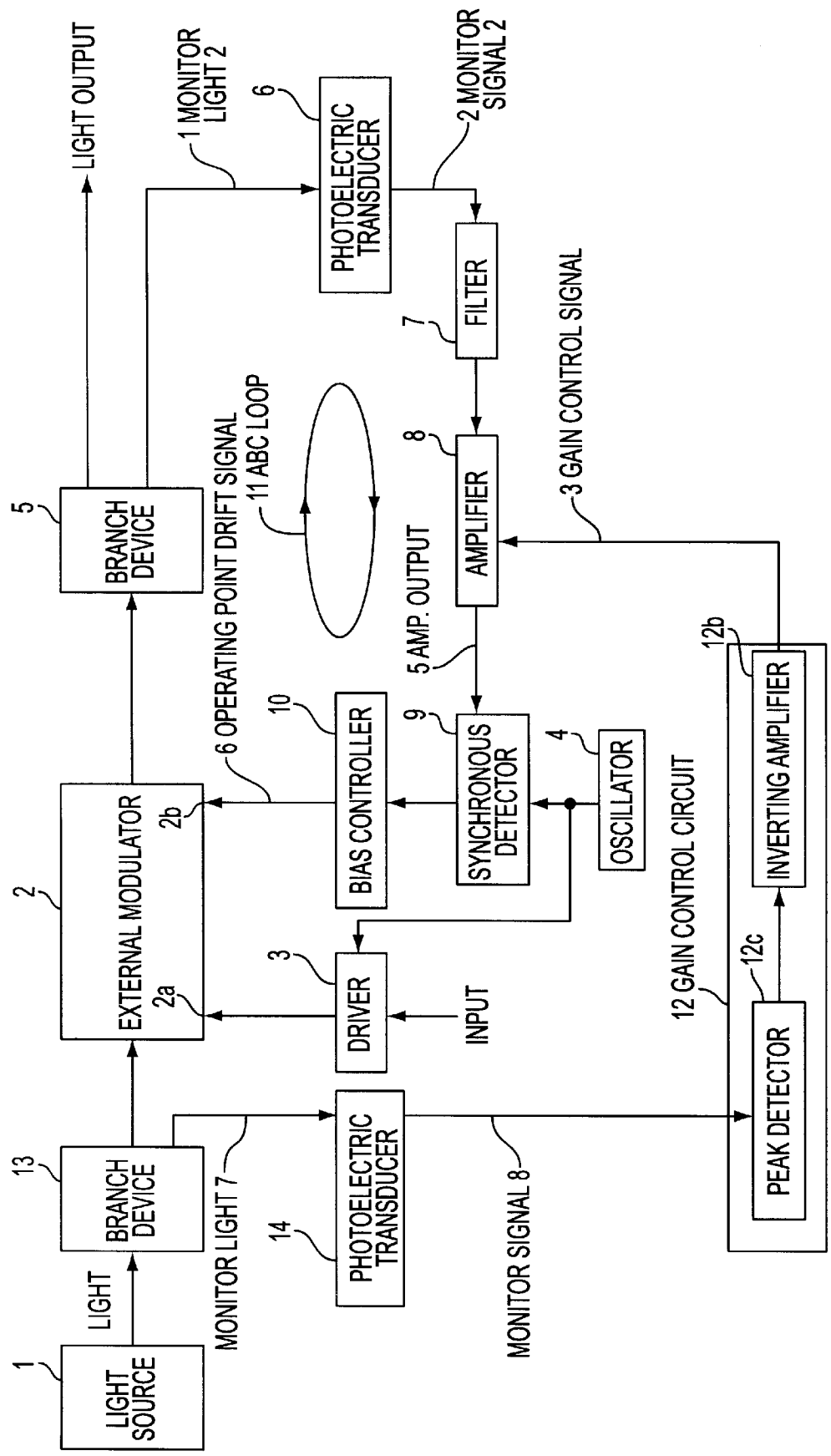
FIG. 7 is a block diagram showing an embodiment (5) of a light transmitter according to the present invention.

FIG. 7 shows an embodiment (5) of the light transmitter according to the present invention. The difference between this embodiment and the embodiment (4) shown in FIG. 6 is that in the gain control circuit 12 the average detector 12a is replaced by the peak detector 12c. The gain control circuit 12 in this embodiment (5) corresponds with that in the embodiment (2) shown in FIG. 4.

Figure 8:
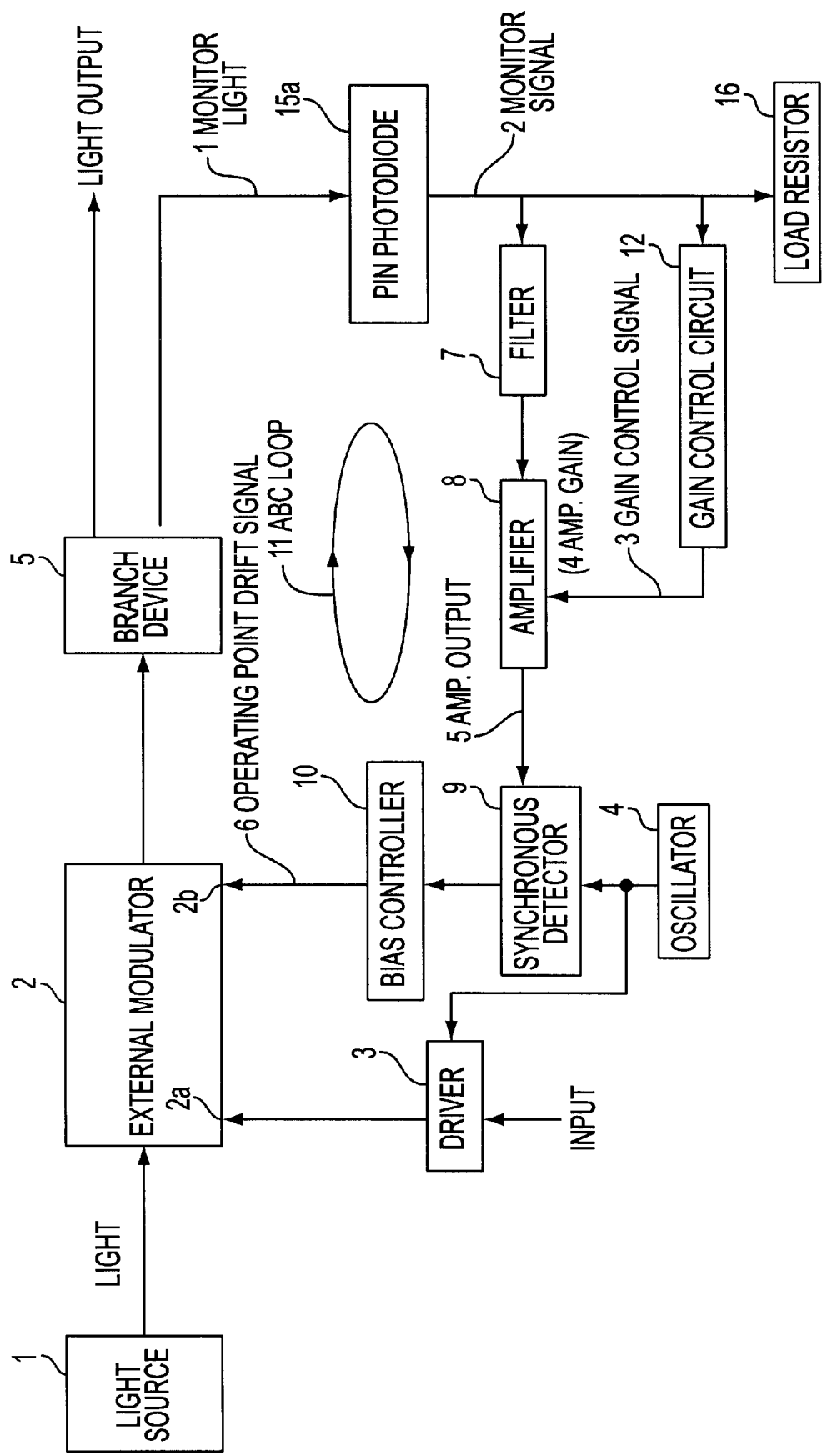
FIG. 8 is a block diagram showing an embodiment (6) of a light transmitter according to the present invention.

FIG. 8 shows an embodiment (6) of the light transmitter according to the present invention. In this embodiment, the photoelectric transducer 6 in the above-mentioned embodiments is composed of a PIN photo diode 15a and a the load resistor 16. The output voltage of the load resistor 16 is furnished as the monitor signal ② for the gain control circuit 12.

Accordingly, the gain control circuit 12 supplies the gain control signal ③ in inverse proportion to the level of the monitor signal ② to the amplifier 8, whereby the fluctuation of the light input signal of the external modulator 2 is absorbed.

Figure 9:
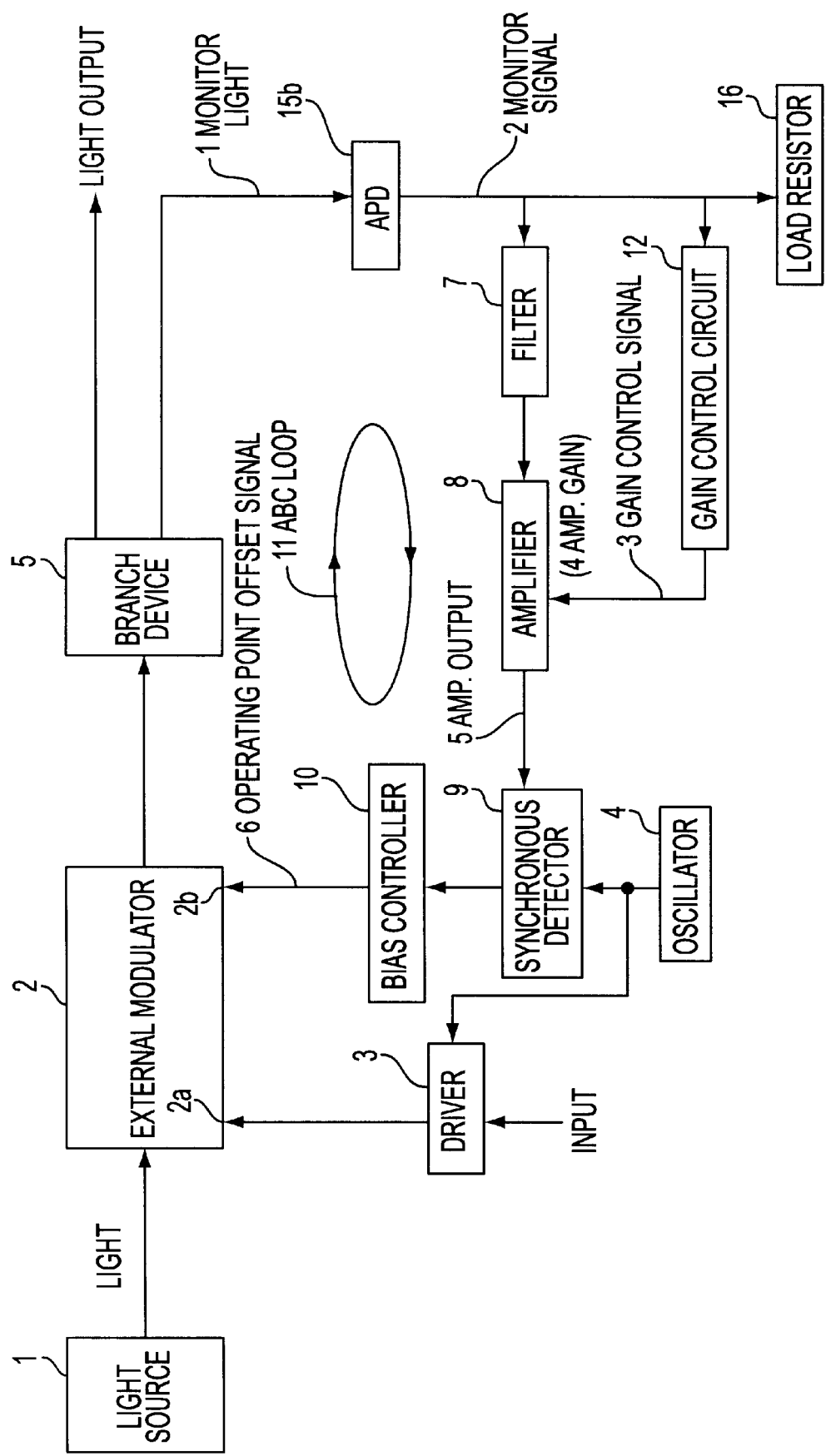
FIG. 9 is a block diagram showing an embodiment (7) of a light transmitter according to the present invention.

FIG. 9 shows an embodiment (7) of the light transmitter according to the present invention. The difference with this embodiment and the embodiment (6) shown in FIG. 8 is that an APD (Avalanche Photo Diode) 13b is substitute for the PIN photo diode 15a. Other operations are similar to the embodiment (6) in FIG. 8.

Figure 10:
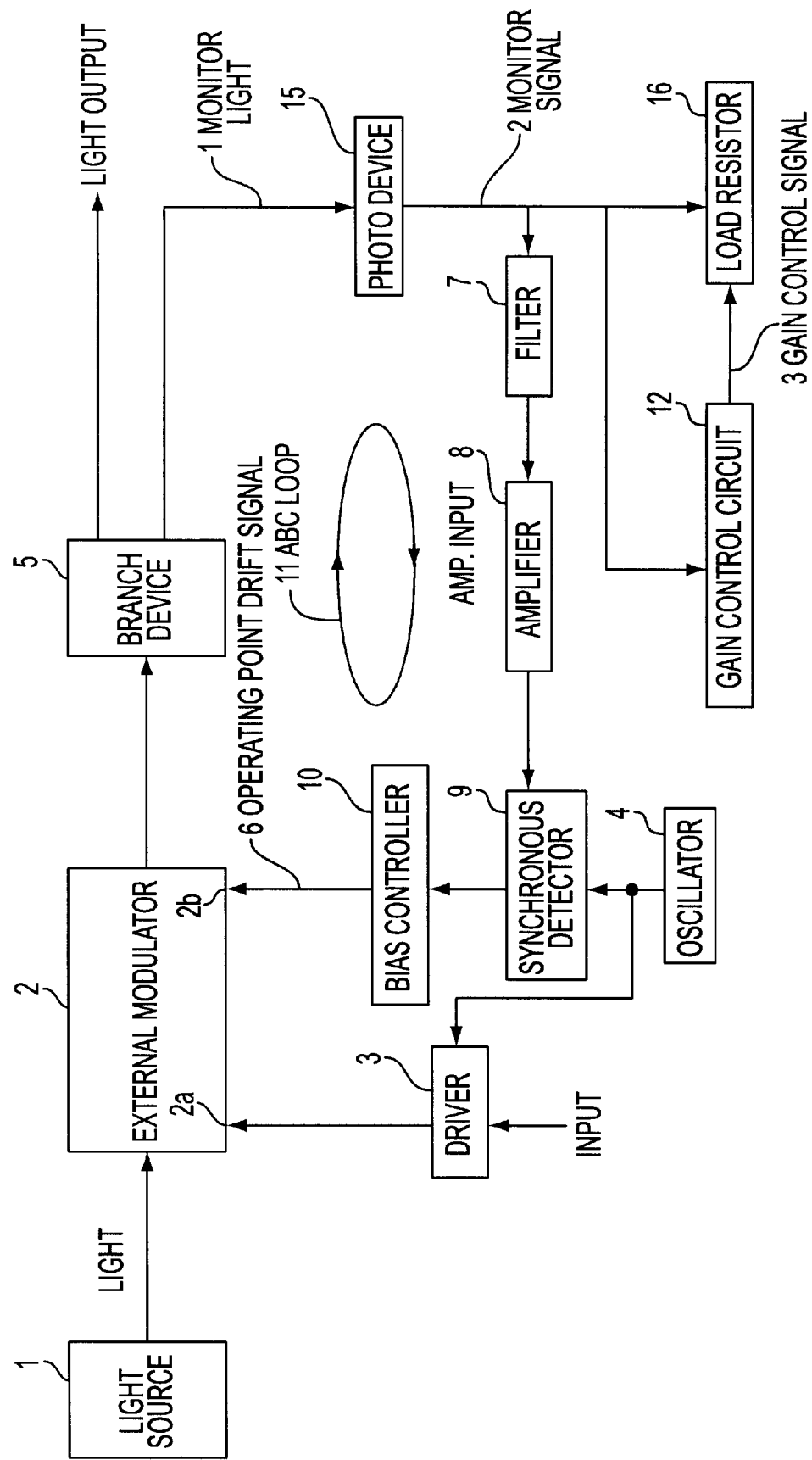
FIG. 10 is a block diagram showing an embodiment (8) of a light transmitter according to the present invention.

FIG. 10 shows an embodiment (8) of the light transmitter according to the present invention. In this embodiment, the photoelectric transducer 6 in the above-mentioned embodiments is composed of a photo device 15 and a variable load resistor 16a. The gain control circuit 12 which receives the monitor signal ② outputted from the photo device 15 supplies the gain control signal ③ to the variable load resistor 16a, not to the amplifier 8.

As a result, the gain control circuit 12 controls such that the variable load resistor 16a generates a load voltage in inverse proportion to the level of the monitor signal ② and supplies it to the filter 7. Therefore, the variable load resistor 16a is controlled to absorb the fluctuation of the light input signal to the external modulator 2 whereby the monitor signal ② is controlled to approach a constant value as shown in FIG. 2D.

Figure 11:
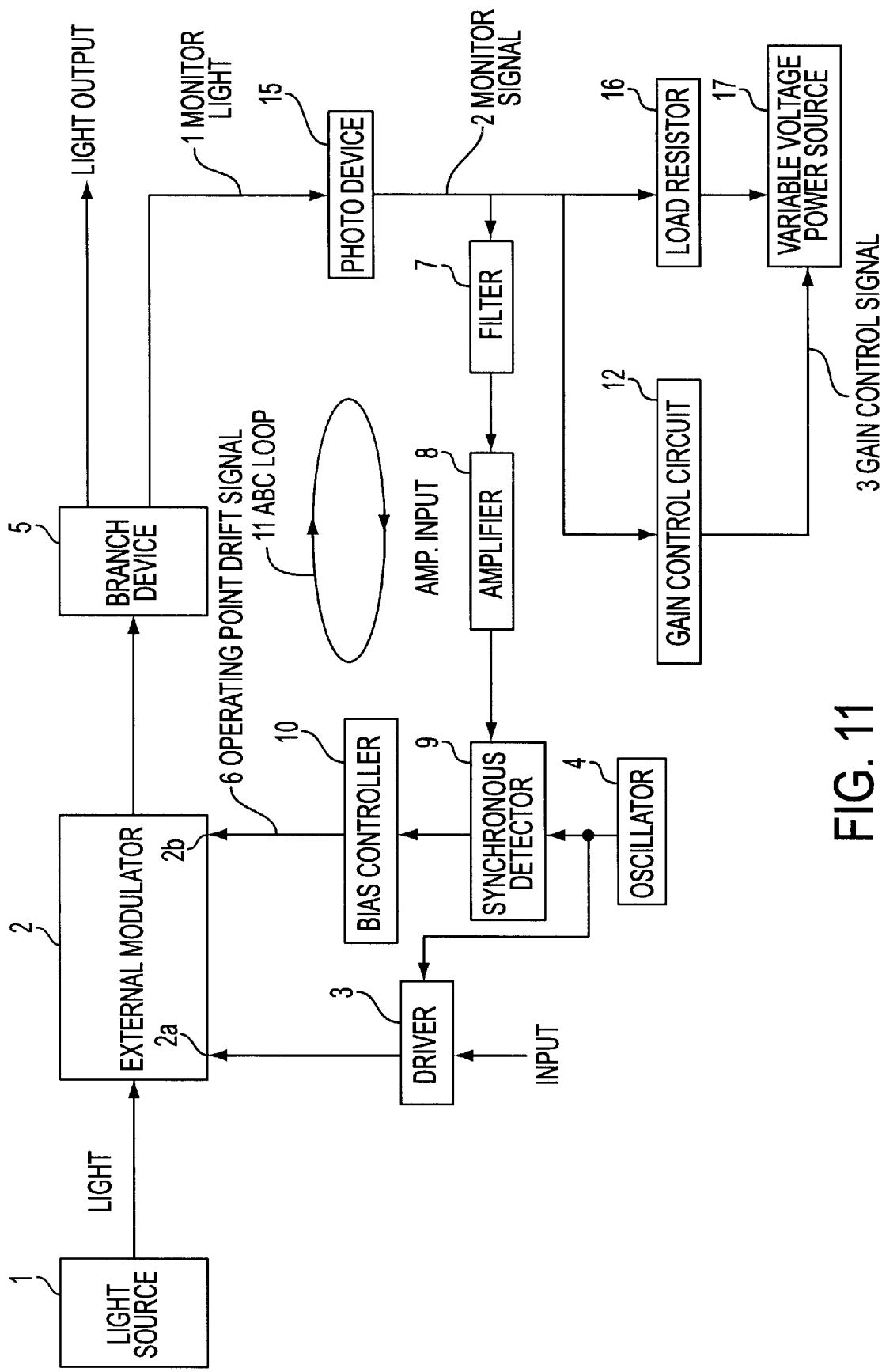
FIG. 11 is a block diagram showing an embodiment (9) of a light transmitter according to the present invention.

FIG. 11 shows an embodiment (9) of the light transmitter according to the present invention. In this embodiment, the photoelectric transducer 6 is composed of the photo device 15 and the load resistor 16. The gain control circuit 12 supplies the gain control signal ③ to a variable voltage power source 17 connected to the load resistor 16, no to the amplifier 8.

In this embodiment, the gain control signal ③ in inverse proportion to the level of the monitor signal ② from the photo device 15 is outputted from the gain control circuit 12 to the variable voltage power source 17. The variable voltage power source 17 then controls the power supply in inverse proportion to the level of the monitor signal ② as the power supply voltage is reduced when the monitor signal ② is large, for instance.

Figure 12:
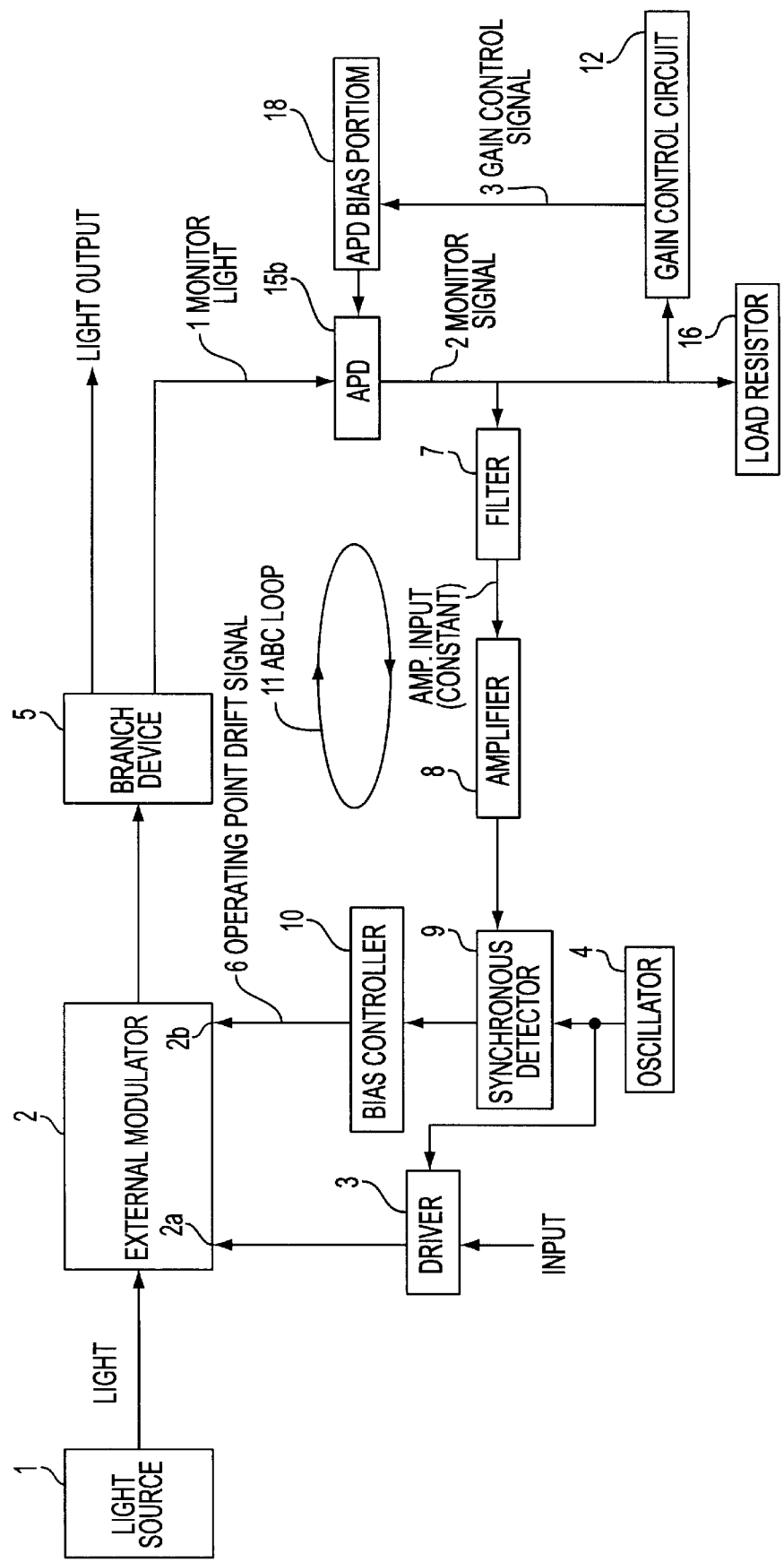
FIG. 12 is a block diagram showing an embodiment (10) of a light transmitter according to the present invention.

FIG. 12 shows an embodiment (10) of the light transmitter according to the present invention. This embodiment is different from the embodiment (7) shown in FIG. 9 in that the gain control circuit 12 does not make a gain control for the amplifier 8, but receives the monitor signal ② from the APD 15b and supplies the gain control signal ③ to the APD bias device 18, which controls the reverse bias voltage of the APD 15b.

Figure 2A:
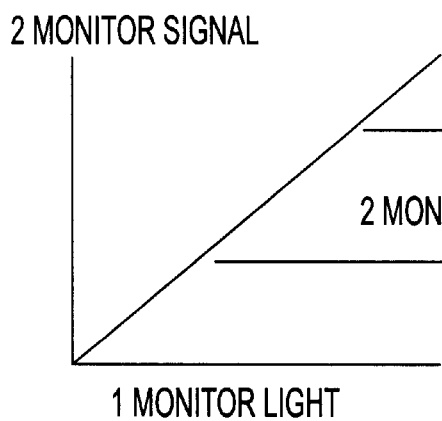
FIGS. 2A–2D are graphs for explaining the operation of a light transmitter according to the present invention.
Figure 2B:
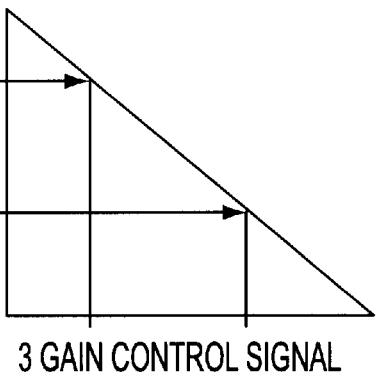
Figure 2C:
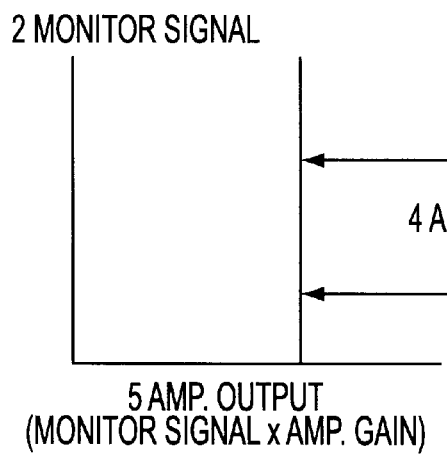
Figure 2D:
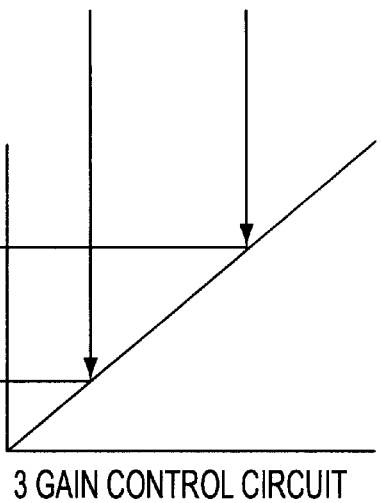

Namely, the gain control circuit 12 outputs the gain control signal ③ in accordance with the characteristic shown in FIG. 2A so that the monitor signal ② is increased to approach a constant value when it is low, for instance. In response, the APD bias device 18 controls the magnification ratio of the APD 15b, thereby absorbing the level fluctuation of the light input signal of the external modulator 2.

Figure 13:
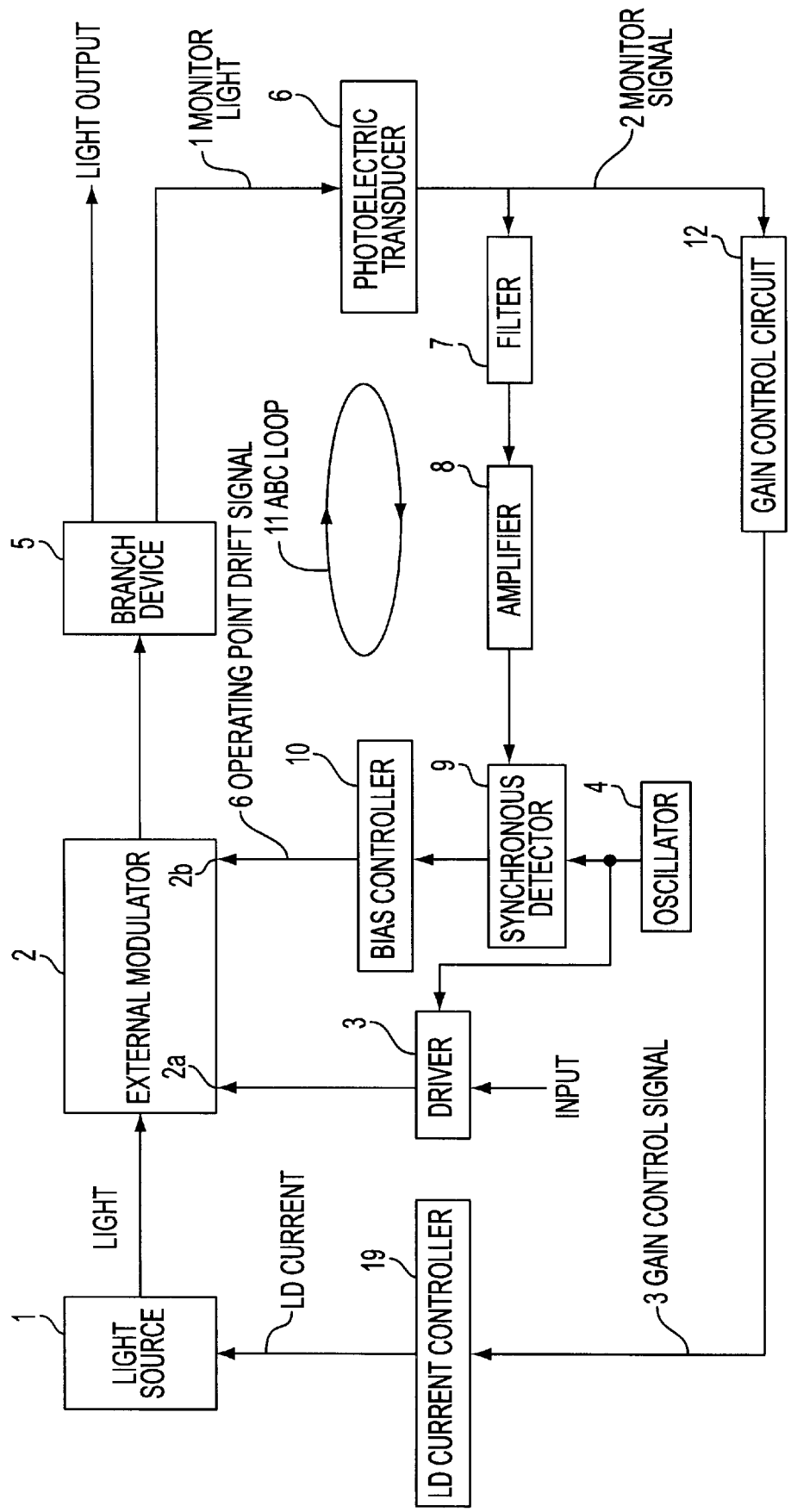
FIG. 13 is a block diagram showing an embodiment (11) of a light transmitter according to the present invention.

FIG. 13 shows an embodiment (11) of the light transmitter according to the present invention. In this embodiment, the gain control circuit 12 does not control the gain of the amplifier 8 like the embodiments shown in FIGS. 1, 3, and 4, but the LD current of the laser diode 1 which is a light source, through the LD current controller.

Namely, the gain control circuit 12 receiving the monitor signal ② outputs the gain control signal ③ in inverse proportion to the level of the monitor signal ② according to the characteristic shown in FIG. 2B to the LD current controller 19. The LD current controller 19 then applies the LD current to the laser diode 1 so that the monitor signal ② is decreased when it is large, for instance. Therefore, the light output signal from the laser diode 1 to the external modulator 2 will be decreased, leading to the level fluctuation of the light input signal to the external modulator 2 being absorbed.

Figure 14:
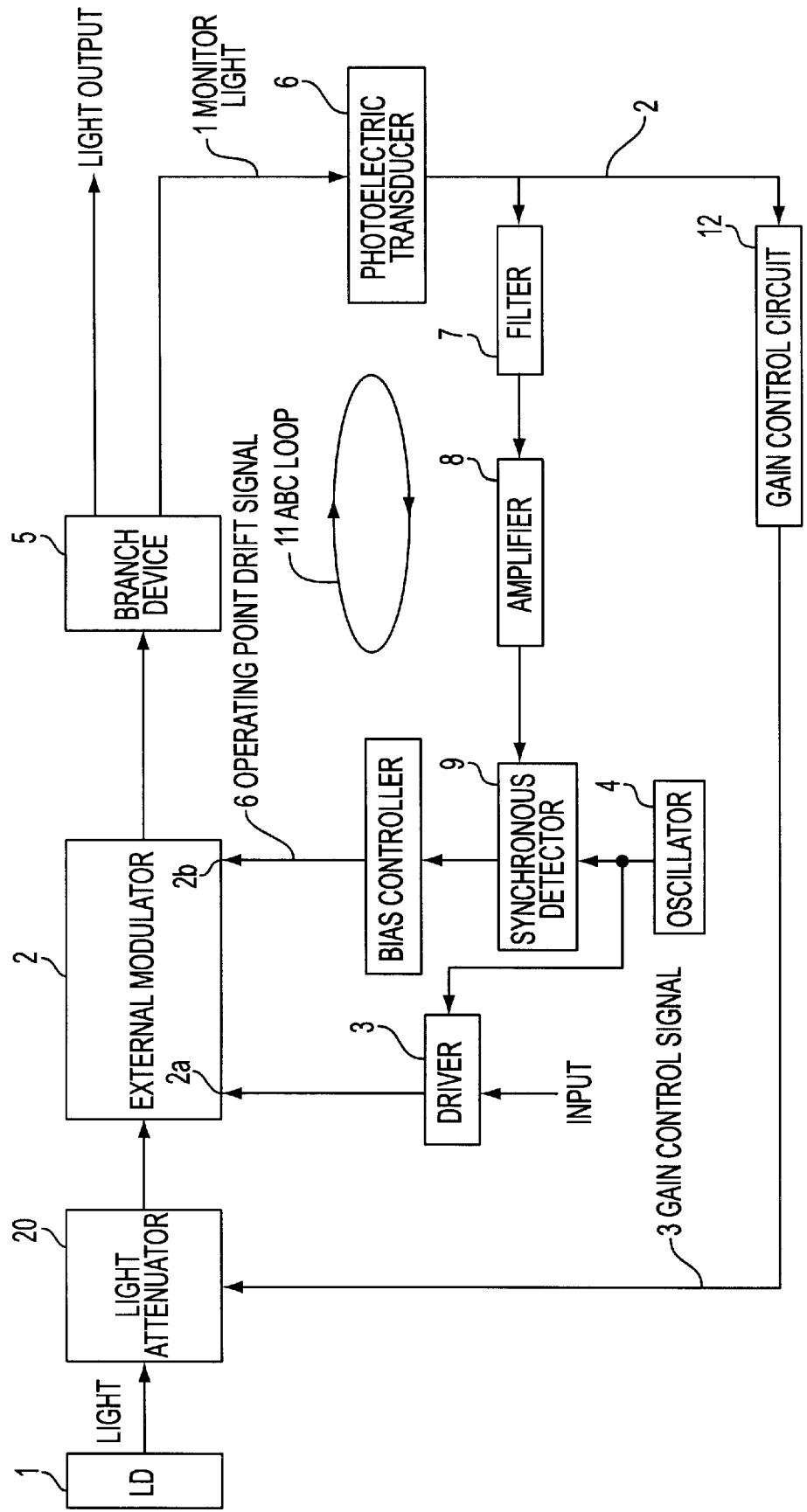
FIG. 14 is a block diagram showing an embodiment (12) of a light transmitter according to the present invention.

FIG. 14 shows an embodiment (12) of the light transmitter according to the present invention. In this embodiment, while the embodiment (11) shown in FIG. 13 directly controls the laser diode 1 through the LD current controller 19, the gain control circuit 12 supplies the gain control signal ③ to the light attenuator 22 provided between the laser diode 1 and the external modulator 2.

Namely, the gain control circuit 12 supplies the gain control signal ③ in inverse proportion to the level of the monitor signal ② to the light attenuator 22 in which the attenuation is enlarged when the monitor signal ② is large, for instance.

Hence, the fluctuation of the light output from the laser diode 1 can be absorbed by the combination of the gain control circuit 12 and the light attenuator 22.

Figure 15:
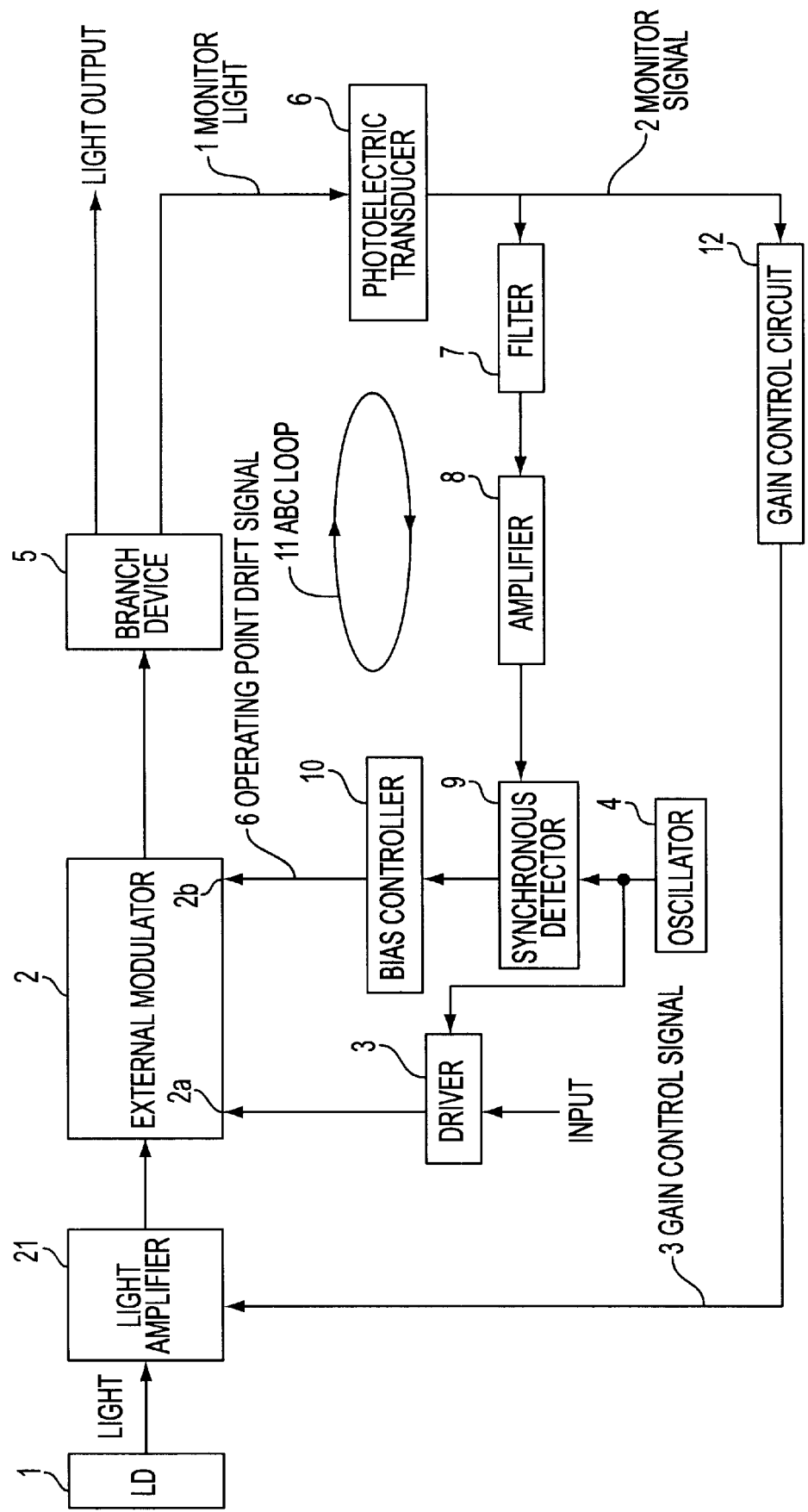
FIG. 15 is a block diagram showing an embodiment (13) of a light transmitter according to the present invention.

FIG. 15 shows an embodiment (13) of the light transmitter according to the present invention. In this embodiment, the light amplifier 23 is substituted for the light attenuator 22 in the embodiment (12) shown in FIG. 14.

Namely, the gain control signal ③ in inverse proportion to the level of the monitor signal ② is provided from the gain control circuit 12 to the light amplifier 23 whereby the fluctuation of the light output of the laser diode 1 is absorbed by the light attenuator 23.

Alternatively, in FIGS. 14 and 15, an electric field absorption type the external modulator may be used as a means for absorbing the output fluctuation of the laser diode 1.

Figure 16:
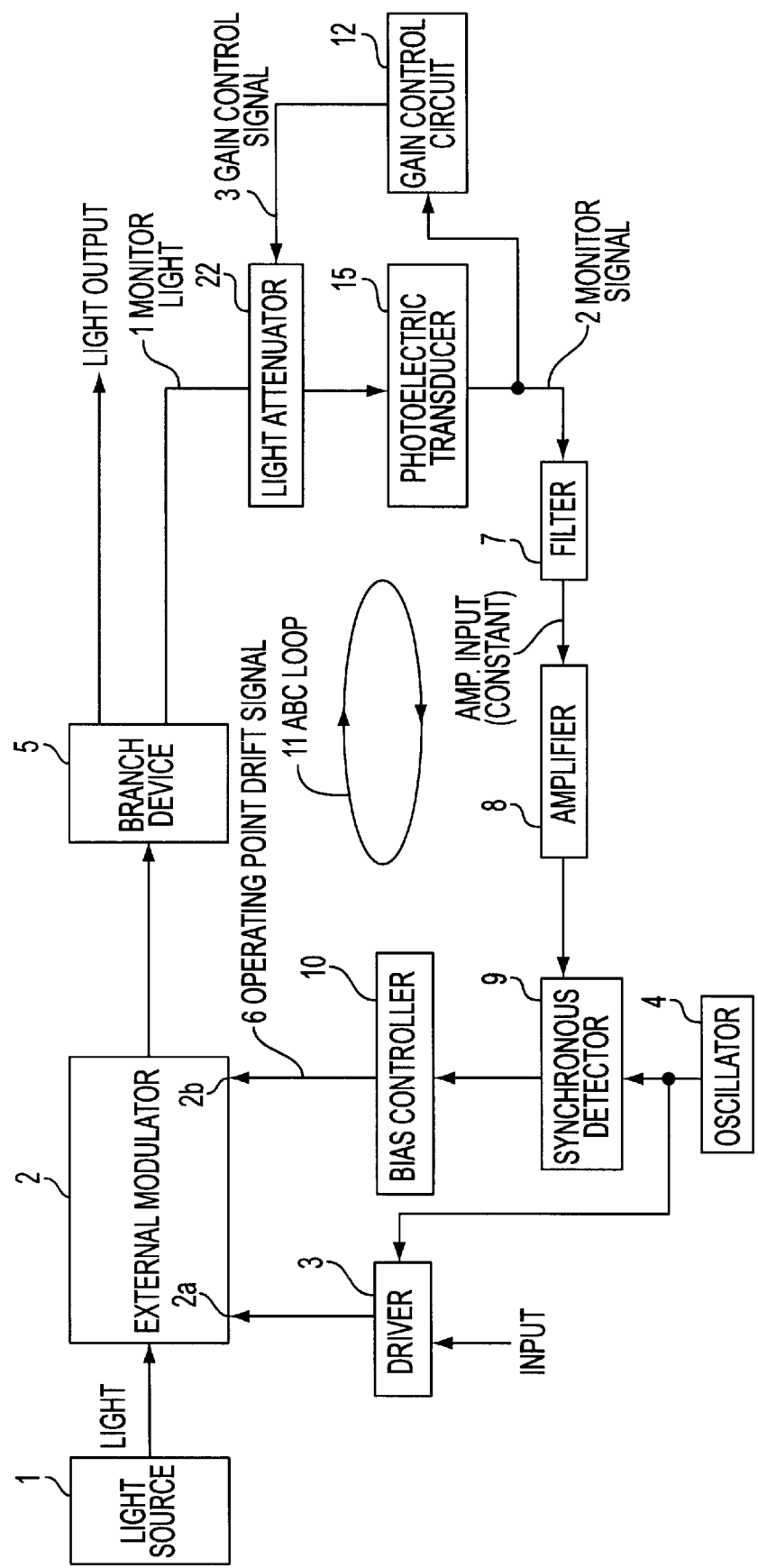
FIG. 16 is a block diagram showing an embodiment (14) of a light transmitter according to the present invention.

FIG. 16 shows an embodiment (14) of the light transmitter according to the present invention. In this embodiment, the light attenuator in the embodiment (14) shown in FIG. 14 is provided between the branch device 5 and the photoelectric transducer 6, not between the laser diode 1 and the external modulator 2. The gain control circuit 12 supplies the gain control signal ③ in inverse proportion to the level of the monitor signal ② to the light attenuator 22.

Therefore, except for the light attenuator 22 provided at the input or output side of the external modulator 2 in relation to the embodiment (12) of FIG. 14, the gain control signal ② is provided for the light attenuator 22 after the level fluctuation of the light input signal of the external modulator 2 having been absorbed with the monitor signal ② at the gain control circuit 12.

Figure 17:
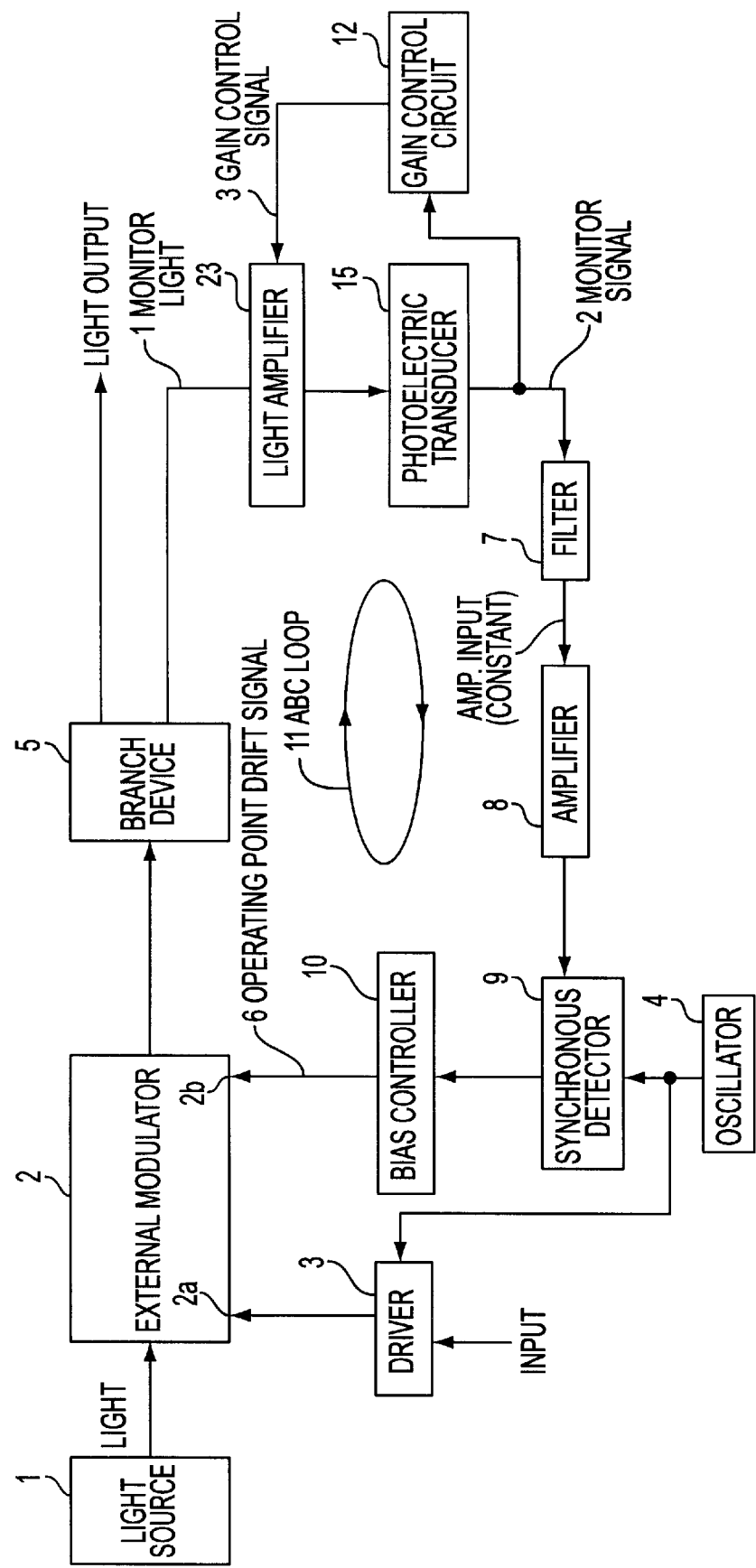
FIG. 17 is a block diagram showing an embodiment (15) of a light transmitter according to the present invention.

FIG. 17 shows an embodiment (15) of the light transmitter according to the present invention. In this embodiment, the light amplifier 23 is substituted for the light attenuator 22 in the embodiment (14) of FIG. 16 to absorb the level fluctuation of the monitor signal ② instead of the light attenuator 22.

Figure 18:
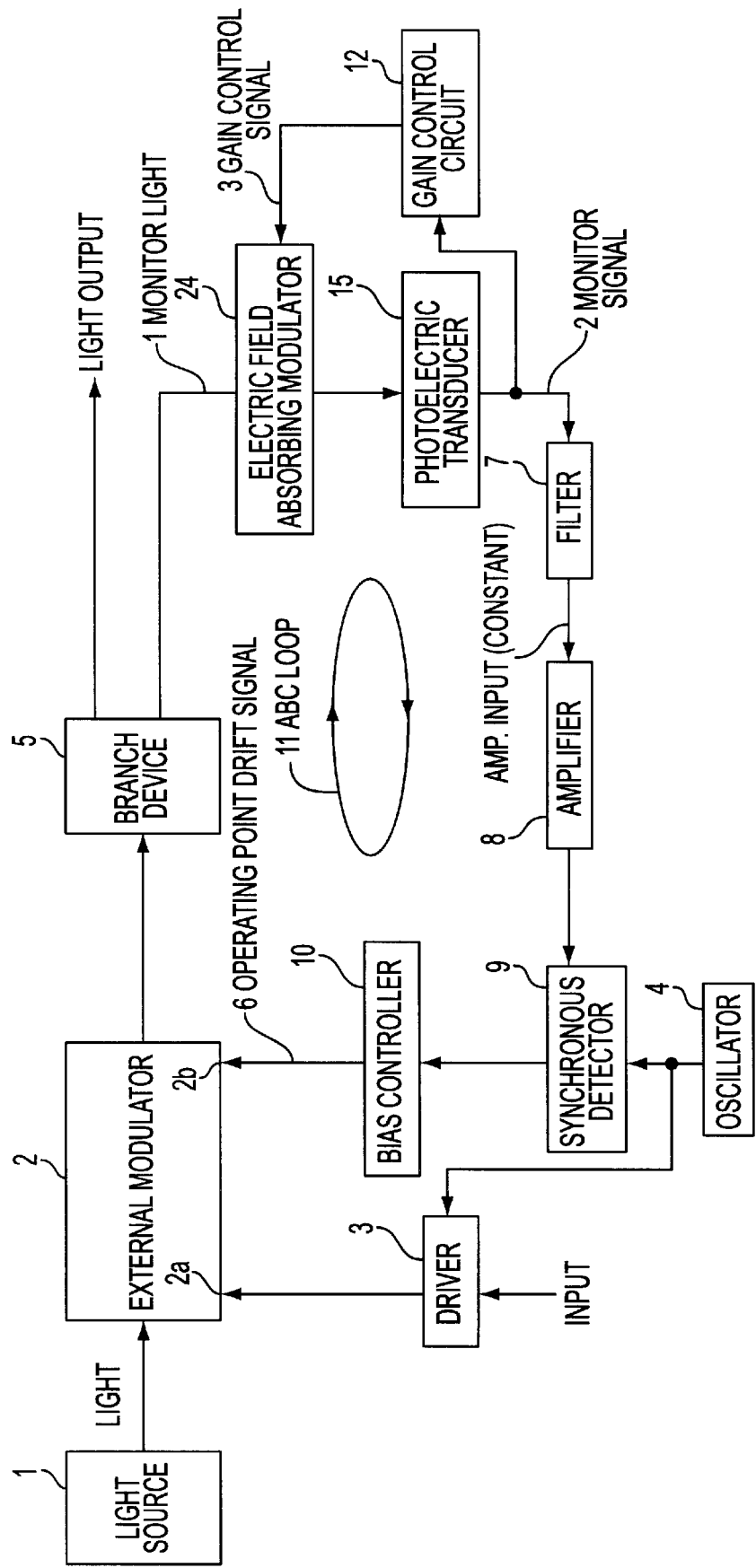
FIG. 18 is a block diagram showing an embodiment (16) of a light transmitter according to the present invention.
Figure 19:
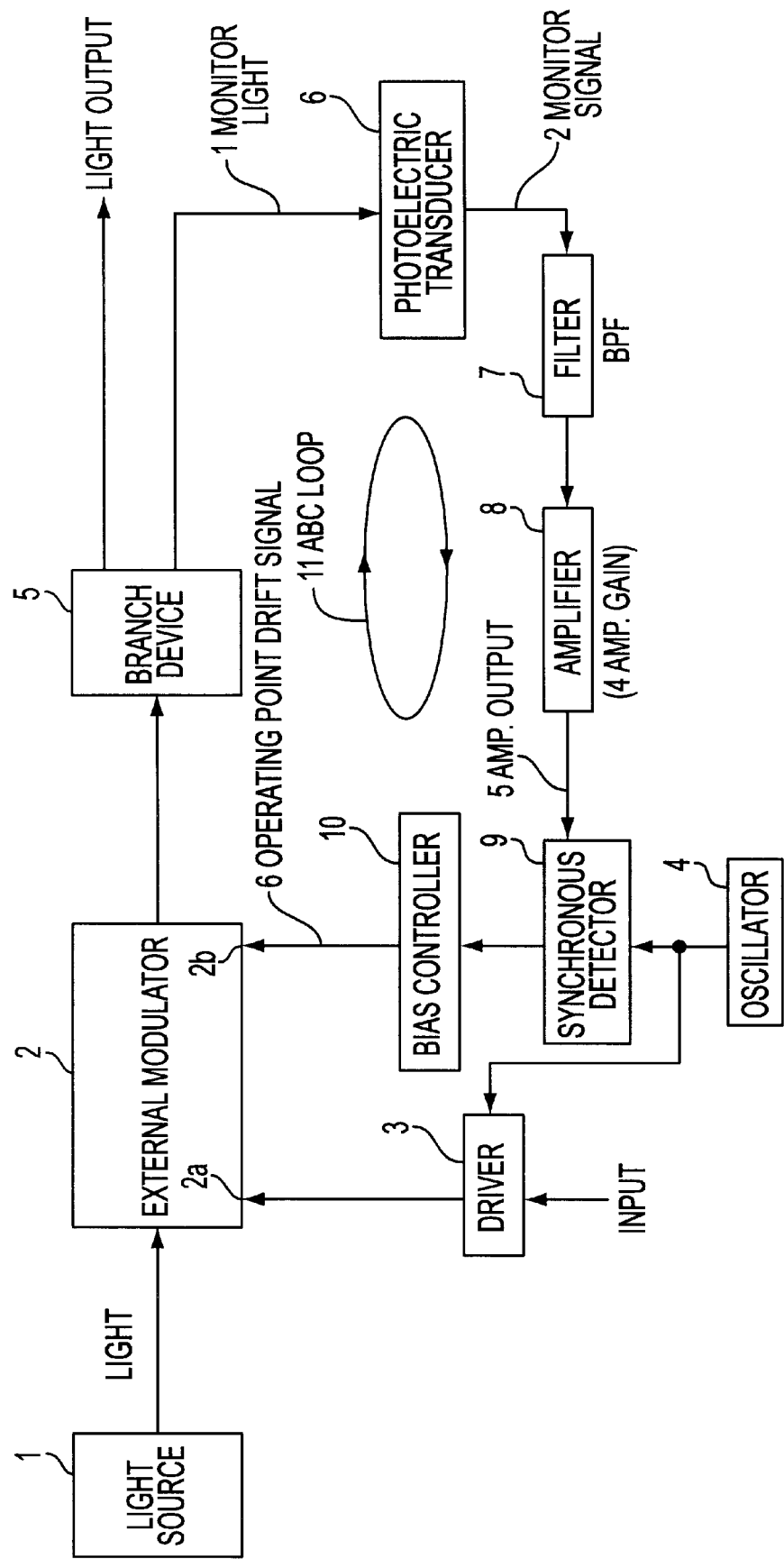
FIG. 19 is a block diagram showing the arrangement of the prior art light transmitter.

FIG. 18 shows an embodiment (16) of the light transmitter according to the present invention In this embodiment, the electric field absorbing modulator 24 is substituted for the light amplifier 23 in the embodiment (15) shown in FIG. 17.

Namely, in this embodiment, the gain control circuit 12 supplies the gain control signal ③ in inverse proportion to the level of the monitor signal ② to the electric field absorbing modulator 24 the bias voltage of which is controlled whereby the level of the monitor light ① to the photoelectric transducer 6 is controlled to absorb the level fluctuation of the light input signal to the external modulator 2 as the light attenuator 22 in the embodiment (14) shown in FIG. 16 is.

Figure 20:
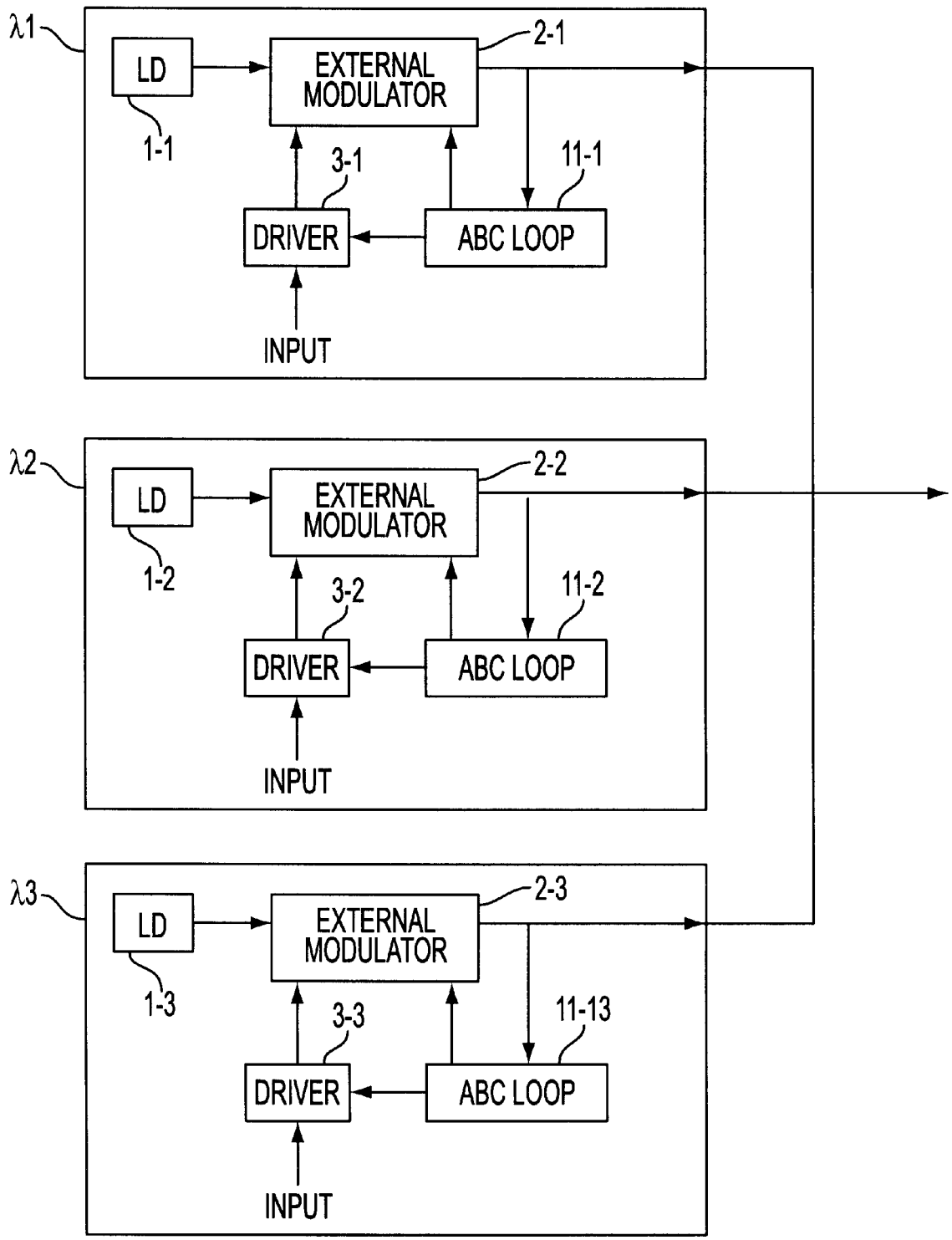
FIG. 20 is a block diagram showing an example of the prior art light transmitter applied to the WDM system.
Figures 21A, 21B, 21C:
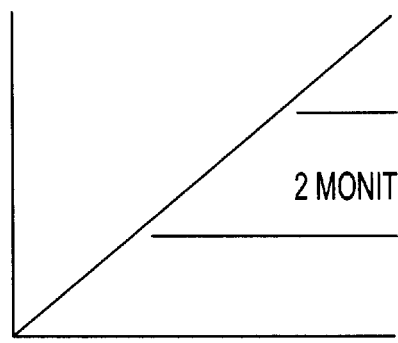
FIGS. 21A–21C are graphs for explaining the operation of the prior art.

The respective arrangements shown in FIGS. 3–18 may be provided at the output sides of the laser diodes for the units of the light WDM communication system shown in FIG. 20.

According to the light transmitter of the present invention as above-mentioned, it is arranged that a part of a light output/input signal of the external modulator is branched to detect an electrical monitor signal and a gain control signal is generated in inverse proportion to the level of the monitor signal to control the gain of the automatic bias control circuit in the transmitter. Therefore, the gain of a photo device or amplifier in the automatic bias control circuit can be changed according to the light output level of a light source to widen the allowance of the automatic bias control circuit against the light fluctuation of the light source.

Therefore, it is unnecessary to design automatic bias control circuit corresponding to laser diodes respectively so that individual automatic bias control circuits are not required for the light sources of the light WDM system where plural light sources with different optical level and wavelengths are associated with plural external modulators, resulting in a low cost.

What we claim is:

1. A light transmitter comprising:
    an external modulator for modulating an output signal of a light source with an electrical monitor signal; and
    an automatic bias control circuit, including an amplifier, which automatically controls a bias for the external modulator;
    the automatic bias control circuit having a monitor signal detector which branches a part of a light output signal of the external modulator to detect the monitor signal, and a gain control circuit which generates a gain control signal which decreases in level as the monitor signal increases and vice versa to control a gain of the amplifier.

2. A light transmitter as claimed in claim 1 wherein the monitor signal detector comprises a branch device which branches the light output signal as a monitor light, and a photoelectric transducer which converts the monitor light into the monitor signal.

3. A light transmitter as claimed in claim 1 wherein the gain control circuit comprises a series circuit of an average detector and an inverting amplifier.

4. A light transmitter as claimed in claim 1 wherein the gain control circuit comprises a series circuit of a peak detector and an inverting amplifier.

5. A light transmitter as claimed in claim 2 wherein the photoelectric transducer comprises a photo device, connected to a load resistor, which supplies the output voltage of the load resistor for the gain control circuit.

6. A light transmitter as claimed in claim 5 wherein the photo device comprises a PIN photo diode.

7. A light transmitter as claimed in claim 5 wherein the photo device comprises an APD.

8. A light transmitter comprising:
    an external modulator for modulating an output signal of a light source with an electrical monitor signal; and
    an automatic bias control circuit, including an amplifier, which automatically controls a bias for the external modulator;
    a monitor signal detector which branches a part of a light input signal of the external modulator to detect the monitor signal; and
    a gain control circuit which generates a gain control signal which decreases in level as the monitor signal increases and vice versa to control a gain of the amplifier.

9. A light transmitter as claimed in claim 8 wherein the monitor signal detector comprises a branch device which branches the light input signal as a monitor light, and a photoelectric transducer which converts the monitor light into the monitor signal.

10. A light transmitter comprising:
    an external modulator for modulating an output signal of a light source with an electrical monitor signal; and
    an automatic bias control circuit, including an amplifier, which automatically controls a bias for the external modulator;
    the automatic bias control circuit having a branch device which branches a part of a light output signal of the external modulator as a monitor light and a photo device which transduces the monitor light into the monitor signal and is connected to a variable load resistor;
    the transmitter further comprising a gain control circuit which inputs a load voltage of the variable load resistor as the monitor signal and generates a gain control signal for controlling the variable load resistor so as to generate a load voltage which decreases in level as the monitor signal increases and vice versa.

11. A light transmitter as claimed in claim 10 wherein the automatic bias control circuit is provided for each of plural modulators respectively corresponding to plural light sources.

12. A light transmitter comprising:

an external modulator for modulating an output signal of a light source with an electrical monitor signal; and an automatic bias control circuit, including an amplifier, which automatically controls a bias for the external modulator;

the automatic bias control circuit having a branch device which branches a part of a light output signal of the external modulator as a monitor light and an APD which transduces the monitor light into the monitor signal and is connected to a load resistor;

the transmitter further comprising an APD bias device for controlling a bias voltage of the APD and a gain control circuit which inputs a load voltage of the load resistor as the monitor signal and generates a gain control signal for controlling the APD bias device so as to generate a load voltage which decreases in level as the monitor signal increases and vice versa.

13. A light transmitter as claimed in claim 12 wherein the automatic bias control circuit is provided for each of plural modulators respectively corresponding to plural light sources.

14. A light transmitter comprising:

an external modulator for modulating an output signal of a light source with an electrical monitor signal; and an automatic bias control circuit, including an amplifier, which automatically controls a bias for the external modulator;

the automatic bias control circuit having a monitor signal detector which branches a part of a light output signal of the external modulator to detect the monitor signal;

the transmitter further comprising a light attenuator inserted between the external modulator and the light source, and a gain control circuit which generates a gain control signal for controlling the light attenuator so that a light input signal of the external modulator decreases in level as the monitor signal increases and vice versa.

15. A light transmitter as claimed in claim 14 wherein the automatic bias control circuit is provided for each of plural modulators respectively corresponding to plural light sources.

16. A light transmitter comprising:

an external modulator for modulating an output signal of a light source with an electrical monitor signal; and an automatic bias control circuit, including an amplifier, which automatically controls a bias for the external modulator;

the automatic bias control circuit having a branch device which branches a part of a light output signal of the external modulator as a monitor light and a photoelectric transducer which transduces the monitor light into the monitor signal;

the transmitter further comprising a light attenuator inserted between the branch device and the photoelectric transducer, and a gain control circuit which generates a gain control signal for controlling the light attenuator so that the monitor light decreases in level as the monitor signal increases and vice versa.

17. A light transmitter as claimed in claim 16 wherein the automatic bias control circuit is provided for each of plural modulators respectively corresponding to plural light sources.

18. A light transmitter comprising:

an external modulator for modulating an output signal of a light source with an electrical monitor signal; and an automatic bias control circuit, including an amplifier, which automatically controls a bias for the external modulator;

the automatic bias control circuit having a branch device which branches a part of a light output signal of the external modulator as a monitor light and a photoelectric transducer which transduces the monitor light into the monitor signal;

the transmitter further comprising an electric field absorbing external modulator inserted between the branch device and the photoelectric transducer, and a gain control circuit which generates a gain control signal for controlling the electric field absorbing external modulator so that the monitor light decreases in level as the monitor signal increases and vice versa.

19. A light transmitter as claimed in claim 18 wherein the automatic bias control circuit is provided for each of plural modulators respectively corresponding to plural light sources.

20. A light transmitter comprising:

an external modulator for modulating an output signal of a light source with an electrical monitor signal; and an automatic bias control circuit, including an amplifier, which automatically controls a bias for the external modulator;

the automatic bias control circuit having a branch device which branches a part of a light output signal of the external modulator as a monitor light and a photo device which transduces the monitor light into the monitor signal and is connected to a load resistor associated with a variable voltage power source;

the transmitter further comprising a gain control circuit which inputs a load voltage of the load resistor as the monitor signal and generates a gain control signal for controlling the variable voltage power source so as to generate a load voltage which decreases in level as the monitor signal increases and vice versa.

21. A light transmitter as claimed in claim 20 wherein the automatic bias control circuit is provided for each of plural modulators respectively corresponding to plural light sources.

22. A light transmitter comprising:

an external modulator for modulating an output signal of a light source with an electrical monitor signal; and an automatic bias control circuit, including an amplifier, which automatically controls a bias for the external modulator;

the automatic bias control circuit having a monitor signal detector which branches a part of a light output signal of the external modulator to detect the monitor signal;

the transmitter further comprising an LD current controller connected to a laser diode employed as an input light source for the external modulator, and a gain control circuit which generates a gain control signal for a current control of the laser diode through the LD current controller so that the light output signal of the external modulator decreases in level as the monitor signal increases and vice versa.

23. A light transmitter as claimed in claim 22 wherein the automatic bias control circuit is provided for each of plural modulators respectively corresponding to plural light sources.

24. A light transmitter comprising:

an external modulator for modulating an output signal of a light source with an electrical monitor signal; and an automatic bias control circuit, including an amplifier, which automatically controls a bias for the external modulator;

the automatic bias control circuit having a monitor signal detector which branches a part of a light output signal of the external modulator to detect the monitor signal;

the transmitter further comprising a light amplifier inserted between the external modulator and the light source, and a gain control circuit which generates a gain control signal for controlling the light amplifier so that a light input signal of the external modulator decreases in level as the monitor signal increases and vice versa.

25. A light transmitter as claimed in claim 24 wherein the automatic bias control circuit is provided for each of plural modulators respectively corresponding to plural light sources.

26. A light transmitter comprising:

an external modulator for modulating an output signal of a light source with an electrical monitor signal; and an automatic bias control circuit, including an amplifier, which automatically controls a bias for the external modulator;

the automatic bias control circuit having a branch device which branches a part of a light output signal of the external modulator as a monitor light and a photoelectric transducer which transduces the monitor light into the monitor signal;

the transmitter further comprising a light amplifier inserted between the branch device and the photoelectric transducer, and a gain control circuit which generates a gain control signal for controlling the light amplifier so that the monitor light decreases in level as the monitor signal increases and vice versa.

27. A light transmitter as claimed in claim 26 wherein the automatic bias control circuit is provided for each of plural modulators respectively corresponding to plural light sources.

28. A light transmitter comprising:

an external modulator for modulating an output signal of a light source with an electrical monitor signal; and an automatic bias control circuit, including an amplifier, which automatically controls a bias for the external modulator;

the automatic bias control circuit having a monitor signal detector which branches a part of a light output signal of the external modulator to detect the monitor signal;

the transmitter further comprising an electric field absorbing external modulator inserted between the external modulator and the light source, and a gain control circuit which generates a gain control signal for controlling the electric field absorbing external modulator so that a light input signal of the external modulator decreases in level as the monitor signal increases and vice versa.

29. A light transmitter as claimed in claim 28 wherein the automatic bias control circuit is provided for each of plural modulators respectively corresponding to plural light sources.

30. A light transmitter as claimed in any one of claims 1–12, 14, 16, 18, 20, 22, 24, 26 and 28 wherein the automatic bias control circuit is provided for each of plural modulators respectively corresponding to plural light sources.

* * * * *